(12) United States Patent
Cotter et al.

(10) Patent No.: US 12,195,965 B2
(45) Date of Patent: Jan. 14, 2025

(54) COST-EFFECTIVE BULK GLASS REINFORCED COMPOSITE COLUMNS

(71) Applicant: University of South Florida, Tampa, FL (US)

(72) Inventors: John Michael Cotter, Dade City, FL (US); Rasim O. Guldiken, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 278 days.

(21) Appl. No.: 17/675,096

(22) Filed: Feb. 18, 2022

(65) Prior Publication Data

US 2022/0268023 A1   Aug. 25, 2022

Related U.S. Application Data

(60) Provisional application No. 63/151,379, filed on Feb. 19, 2021.

(51) Int. Cl.
*E04C 3/36* (2006.01)
*B32B 1/08* (2006.01)
(Continued)

(52) U.S. Cl.
CPC .................. *E04C 3/36* (2013.01); *B32B 1/08* (2013.01); *B32B 7/022* (2019.01); *B32B 17/10* (2013.01); *C03C 3/078* (2013.01); *C03C 3/089* (2013.01)

(58) Field of Classification Search
CPC ........... B32B 1/08; B32B 7/022; B32B 17/10; E04C 3/36
(Continued)

(56) References Cited

U.S. PATENT DOCUMENTS 3,238,690 A * 3/1966 Wilkins .................... E04C 3/29
52/843
3,413,775 A * 12/1968 Katz ....................... E04F 13/18
52/834
(Continued)

FOREIGN PATENT DOCUMENTS

| EP | 2204355 A1 | 7/2010 |
| JP | 2001113631 A | 4/2001 |
| WO | 2018/176067 A2 | 9/2018 |

OTHER PUBLICATIONS

Cotter et al. "Theoretical Design Strategies, Strengths, Costs, and Environmental Impacts of Triple Composite Beams Utilizing Glass Compressive Reinforcement." Journal of Composites Science 4.1 (2020). 17 pages.
(Continued)

*Primary Examiner* — James M Ference
(74) *Attorney, Agent, or Firm* — Quarles & Brady LLP

(57) ABSTRACT

A structural column comprises an inner sleeve comprising a first non-glass material, at least one sheet comprising bulk glass, and an outer sleeve comprising a second non-glass material. The inner sleeve has an outer surface and an inner surface defining a hollow interior of the structural column. An inner surface of each sheet is adjacent to at least a portion of the outer surface of the inner sleeve. The outer sleeve has an inner surface that is attached to at least a portion of an outer surface of each sheet, and the inner surface of the outer sleeve is attached to at least a portion of the outer surface of the inner sleeve. The inner sleeve and the outer sleeve can have a rectangular shape in cross-section. The bulk glass can comprise soda lime glass, and the first non-glass material and the second non-glass material can comprise high-density polyethylene.

22 Claims, 38 Drawing Sheets
(25 of 38 Drawing Sheet(s) Filed in Color)

(51) Int. Cl.
  *B32B 7/022* (2019.01)
  *B32B 17/10* (2006.01)
  *C03C 3/078* (2006.01)
  *C03C 3/089* (2006.01)
(58) Field of Classification Search
  USPC .......................................................... 52/831
  See application file for complete search history.

(56) References Cited

U.S. PATENT DOCUMENTS

| | | | | |
|---|---|---|---|---|
| 3,429,758 | A * | 2/1969 | Young | B29C 53/56 |
| | | | | 273/DIG. 7 |
| 3,574,104 | A * | 4/1971 | Medler | B29C 70/085 |
| | | | | 273/DIG. 7 |
| 3,709,754 | A * | 1/1973 | Medler | B29C 53/562 |
| | | | | 138/144 |
| 3,820,573 | A * | 6/1974 | Carmody | B29C 70/081 |
| | | | | 273/DIG. 7 |
| 3,959,541 | A * | 5/1976 | King | B32B 5/245 |
| | | | | 442/283 |
| 3,974,316 | A * | 8/1976 | Jacquemin | B32B 17/10761 |
| | | | | 428/920 |
| 4,007,075 | A * | 2/1977 | McClain | B29C 41/08 |
| | | | | 156/289 |
| 4,313,287 | A * | 2/1982 | Romig, Jr. | E04C 3/28 |
| | | | | 52/223.4 |
| 4,387,546 | A * | 6/1983 | Kurita | E04C 3/36 |
| | | | | 52/847 |
| 4,769,967 | A * | 9/1988 | Bourrieres | B29C 53/66 |
| | | | | 174/45 R |
| 4,793,703 | A | 12/1988 | Fretz | |
| 5,218,810 | A * | 6/1993 | Isley, Jr. | E04C 5/07 |
| | | | | 52/249 |
| 5,238,716 | A * | 8/1993 | Adachi | B66F 11/044 |
| | | | | 428/36.1 |
| 5,339,594 | A * | 8/1994 | Ventura-Berti | E04H 12/02 |
| | | | | 52/834 |
| 5,451,465 | A * | 9/1995 | Garrioch | B32B 17/06 |
| | | | | 65/102 |
| 5,555,678 | A * | 9/1996 | Schoo | E04C 3/36 |
| | | | | 52/2.13 |
| 5,555,696 | A * | 9/1996 | Morrison, III | E04C 3/36 |
| | | | | 52/843 |
| 5,692,351 | A * | 12/1997 | Morrison, III | E04C 3/36 |
| | | | | 52/297 |
| 5,713,176 | A | 2/1998 | Hunt | |
| 5,858,493 | A * | 1/1999 | Sandt | E04H 12/02 |
| | | | | 52/843 |
| 5,946,880 | A * | 9/1999 | Morrison, III | E04C 3/36 |
| | | | | 52/843 |
| 5,996,521 | A * | 12/1999 | Kitano | B32B 1/08 |
| | | | | 114/90 |
| 6,074,714 | A * | 6/2000 | Gottfried | B32B 1/08 |
| | | | | 428/920 |
| 6,467,118 | B2 | 10/2002 | Dumlao et al. | |
| 7,588,343 | B1 * | 9/2009 | Carter | F21V 33/006 |
| | | | | 362/253 |
| 7,790,277 | B2 * | 9/2010 | Wilenski | C08K 3/40 |
| | | | | 428/297.4 |
| 7,963,125 | B2 * | 6/2011 | Wilenski | C03B 37/027 |
| | | | | 65/444 |
| 10,907,769 | B2 | 2/2021 | Kato et al. | |
| 11,319,706 | B1 * | 5/2022 | Khedmatgozar Dolati | |
| | | | | E04C 3/36 |
| 2003/0157285 | A1 * | 8/2003 | Busshoff | B32B 1/08 |
| | | | | 156/154 |
| 2010/0218839 | A1 * | 9/2010 | Conley | B32B 27/32 |
| | | | | 138/137 |
| 2015/0258750 | A1 | 9/2015 | Kang et al. | |
| 2016/0002927 | A1 * | 1/2016 | Zaghi | E04B 1/30 |
| | | | | 264/129 |
| 2022/0268023 | A1 * | 8/2022 | Cotter | C03C 25/26 |

OTHER PUBLICATIONS

Cotter et al. "Cost-Effective Bulk Glass Reinforced Composite Columns." Journal of Composites Science 4.2. (2020). 19 pages.
Thomason "Glass fibre sizing: A review." Composites Part A: Applied Science and Manufacturing 127 (2019): 105619. 24 pages.
Rayfiel et al., "Development of a glass polymer composite sewer pipe from waste glass." Final report. No. BNL-51194. Brookhaven National Lab.(BNL), Upton, NY (United States), 1980. 78 pages.
"New Reinforcing Medium for Concrete" The Engineering Journal, Oct. 1940, 424-6.
Turner et al., "Fiber glass prestressed concrete" Diss. Virginia Polytechnic Institute, 1963. 122 pages.

* cited by examiner

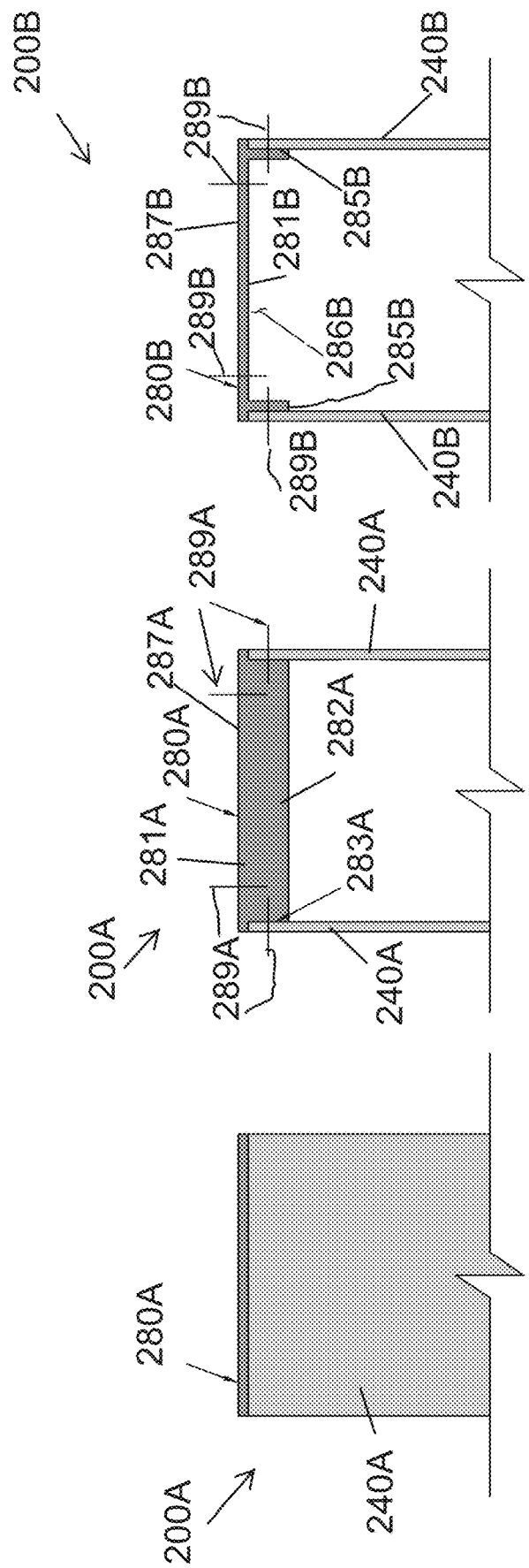

COST-EFFECTIVE BULK GLASS REINFORCED COMPOSITE COLUMNS

CROSS-REFERENCES TO RELATED APPLICATIONS

This application claims priority to U.S. Patent Application No. 63/151,379 filed Feb. 19, 2021.

STATEMENT REGARDING FEDERALLY SPONSORED RESEARCH

Not Applicable.

FIELD OF THE INVENTION

This disclosure relates to the field of composite materials used for construction. Specifically, this disclosure relates to bulk glass composites and the manufacturing thereof.

BACKGROUND

The cost of construction has been increasing, stemming mostly from increased material costs. These rising costs are due in part to the degradability of some common construction materials such as steel or timber. Steel is prone to corrosion, especially when exposed to water as in the case of bridges. Timber is prone to rotting as well as destruction by wood-eating animals (e.g. termites and carpenter bees).

Composite materials have been used for thousands of years, beginning with the use of straw in clay bricks to increase their tensile strength. In the 1800s, the production of steel-reinforced concrete began; this is one of the most common composite materials to date. Additional improvements were made to composites during the 1940s and 1950s for military applications. Generally, composites seek to better the function of an engineered device through the enhancement of its material properties. In fact, composite research that began in the mid-20th century was predicated on finding a method of harnessing crystal strengths as predicted by solid-state theory. Although there has been a marked transition from macro-scale composites to micro- and nano-scale composites, the relative importance of composites of any type has continued to increase over time. The design of composites is unique, as they must incorporate the configuration, manufacturing method, and analysis method all at once in order to provide an effective product. In many ways, the manufacture of composite materials drives the availability of more complex designs. For example, reinforced concrete has unique analysis procedures, a specifically designed reinforcement, and an arrangement that allows the beams to be poured in open-top form.

The use of fiberglass for structural materials is not new (e.g. columns produced by Architectural Fiberglass, Inc; Melton Classics, Inc.; etc.). However, the economic design of structural elements using fiberglass has been difficult due to the relatively high cost to strength ratio of fiberglass. Glass fiber composites have a higher cost compared to standard construction materials although they are less prone to degradation. Bulk glass can be used to overcome the economic issues of glass fibers as bulk glass has a significantly superior compression strength to cost ratio. However, bulk glass does have a lower tensile strength to cost ratio than standard construction material and glass fibers; this means that bulk glass' application must be limited to situations where the bulk glass remains in compression.

Therefore, there exists a need for improved bulk glass reinforced composite materials.

SUMMARY OF THE INVENTION

To achieve the aforementioned needs, this disclosure provides a structural column comprising an inner sleeve comprising a first non-glass material, at least one sheet comprising bulk glass, and an outer sleeve comprising a second non-glass material. The inner sleeve comprises at least one wall, and the inner sleeve has an outer surface and an inner surface defining a hollow interior space of the structural column. An inner surface of each sheet is adjacent to at least a portion of the outer surface of the inner sleeve. The outer sleeve comprises at least one wall, and an inner surface of the outer sleeve is attached to at least a portion of an outer surface of each sheet, and the inner surface of the outer sleeve is attached to at least a portion of the outer surface of the inner sleeve. In one non-limiting embodiment of the structural column, the inner sleeve has a rectangular shape in cross-section, the outer sleeve has a rectangular shape in cross-section, the bulk glass comprises soda lime glass, and the first non-glass material and the second non-glass material are high-density polyethylene. The structural column is a cost competitive material when compared against both structural timbers and structural steel.

The disclosure also provides a method for preparing a structural column or post. The method can include the steps of: (a) providing an inner sleeve comprising a first non-glass material wherein the inner sleeve comprises at least one wall, the inner sleeve having an outer surface and an inner surface defining a hollow interior space of the inner sleeve; (b) placing at least one sheet comprising bulk glass adjacent to at least a portion of the outer surface of the inner sleeve; and (c) forming by over-jacketing extrusion an outer sleeve comprising a second non-glass material over at least a portion of an outer surface of each sheet such that an inner surface of the outer sleeve is attached to at least a portion of an outer surface of each sheet and the inner surface of the outer sleeve is attached to at least a portion of the outer surface of the inner sleeve.

It is one advantage of the present disclosure to provide lower cost structural columns or posts that provide as much/greater buckling resistance as steel columns or timber columns.

It is another advantage of the present disclosure to provide structural columns or posts comprising a composite of low-cost glass and polymer (which provides materials for attaching fixtures).

It is another advantage of the present disclosure to provide structural columns or posts comprising a composite of low-cost glass and recycled polymeric materials.

It is another advantage of the present disclosure to provide structural columns or posts comprising glass which is completely encapsulated, protecting it during installation.

It is another advantage of the present disclosure to provide a composite material that is a low cost alternative, for example, 11% less expensive than timber construction, or 50% less than structural steel.

It is another advantage of the present disclosure to provide a composite material comprising materials that do not naturally degrade. For example, the composite material is rot and corrosion resistant compared to timber and steel.

It is another advantage of the present disclosure to provide a bulk glass polymer composite material that may be used instead of fiberglass reinforced composites.

The foregoing and other aspects and advantages of the invention will appear from the following description and claims and accompanying drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

The present invention is illustrated by way of examples and is not limited in the Figures of the accompanying drawings in which like reference numerals indicate similar elements.

FIG. 28C shows a partial side elevational view of yet another embodiment of a GRCC with an end cap.

FIG. 28D shows a partial longitudinal cross-sectional view of the GRCC with an end cap of FIG. 28C.

FIG. 28E shows a partial longitudinal cross-sectional view of still another embodiment of a GRCC with an end cap.

DETAILED DESCRIPTION OF THE INVENTION

Figure 1:
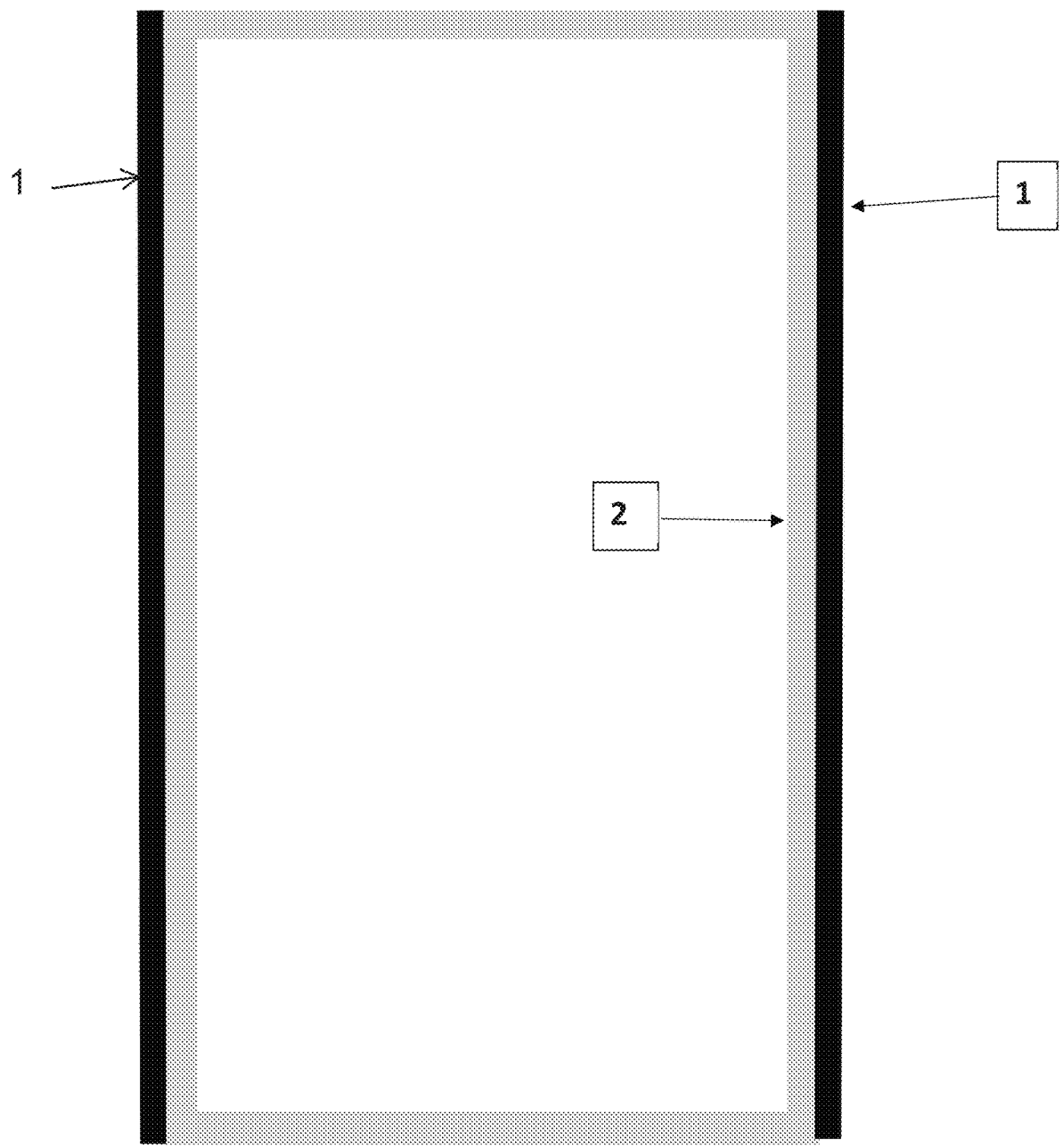
FIG. 1 is a cross-sectional view of bulk glass sheets assembled on an inner sleeve of non-glass material prior to over-jacketing extrusion that forms a structural column.

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including," and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Bulk glass" is defined as any macroscale amount of glass that comprises of a single solid layer or multiple layers fused together as opposed to glass fibers.

"Column" is a structure that may be placed in a vertical orientation or a non-vertical orientation. A "post" is also a structure that may be placed in a vertical orientation or a non-vertical orientation.

"Composite" is defined as a material made from two or more constituent materials with significantly different physical or chemical properties that, when combined, produce a material with characteristics different from the individual components while the individual components remain separate and distinct within the finished structure.

"Over-jacketing extrusion" is defined as a process in which an outer layer is applied onto an existing layer. This process requires an inner sleeve which supports the existing layer during this process. It is known in the art that over-jacketing extrusion may be referred to as "coextrusion".

"Non-glass material" is broadly defined as a material composed of a substance other than glass. Non-limiting examples include polymeric materials and Portland cement. The polymeric materials may include one or more recycled polymeric or recycled inorganic materials.

"Portland cement" is a well-known cement that upon mixing with water binds or unites the other materials present in the mixture into concrete. The Portland cement is typically a Type I, II, III, IV and V Portland cement as defined in ASTM C 150. It is distinct from concrete which is a mixture of Portland cement, sand, aggregate, water, and other materials.

In one embodiment, the bulk glass composite is first comprised of an inner sleeve of non-glass material 2 overlaid with bulk glass 1 to prepare the composite for over-jacketing extrusion by providing support and creating the appropriate shape. See FIG. 1.

Figure 2:
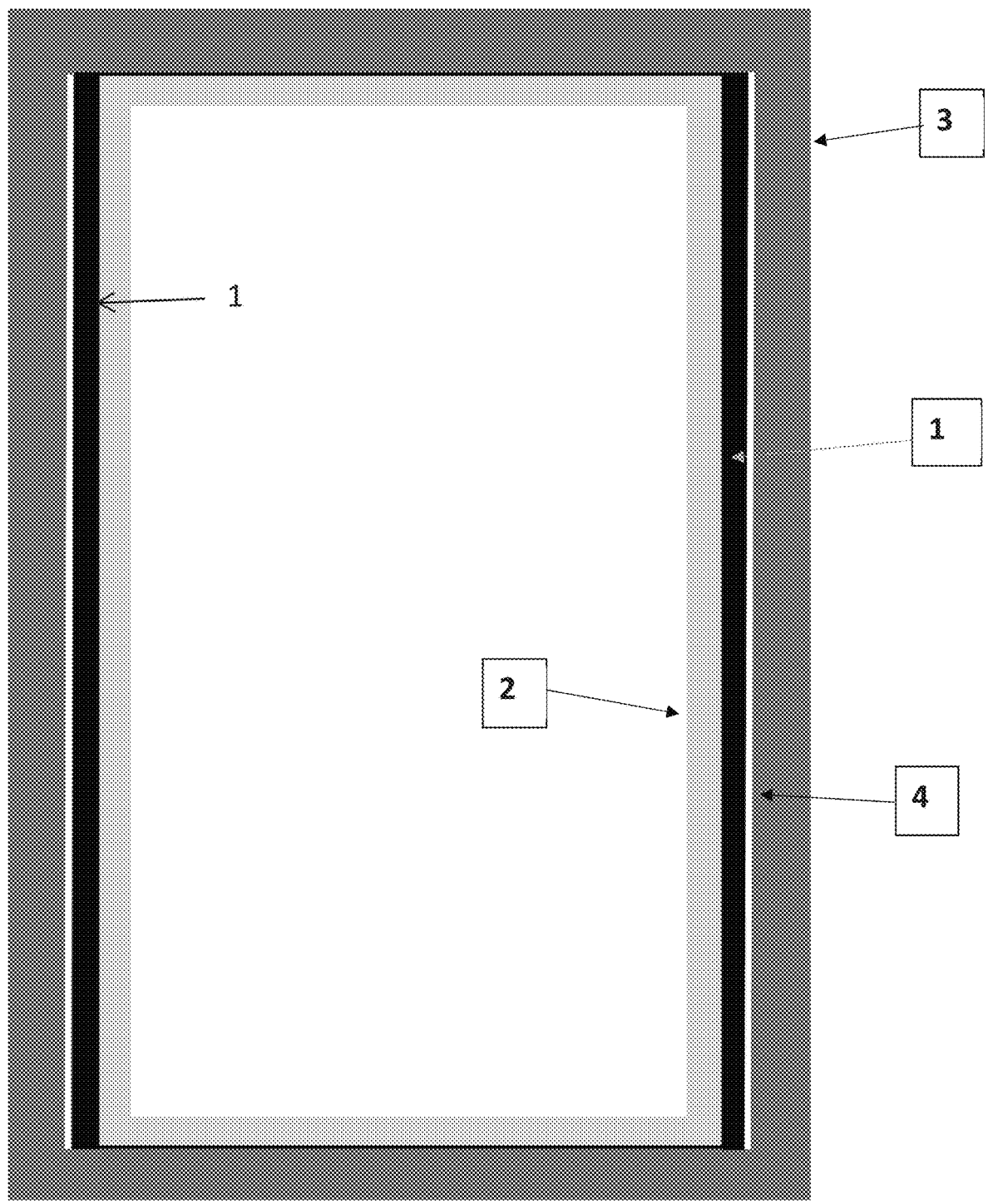
FIG. 2 is a cross-sectional view of a fully assembled bulk glass composite structural column that is made to mimic a timber stud.
Figure 3:
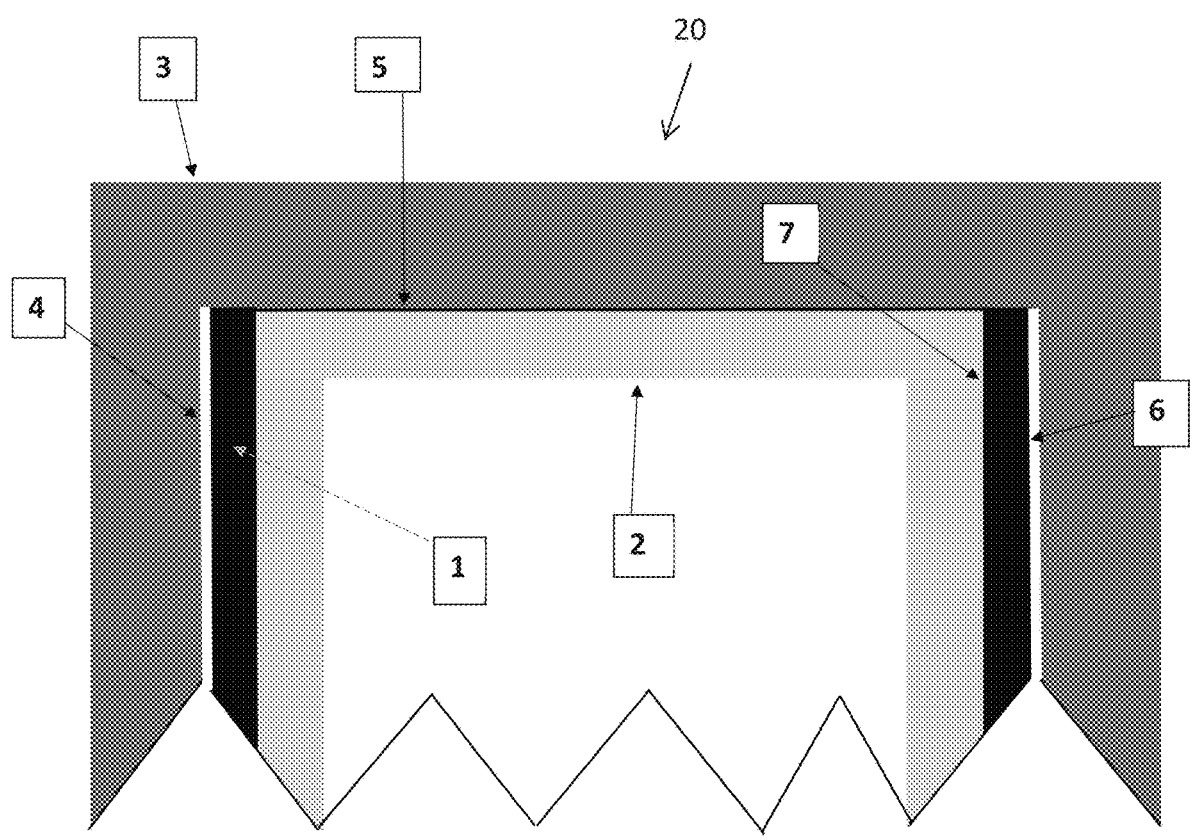
FIG. 3 is a detailed view of the structural column of FIG. 2.
Figure 4:
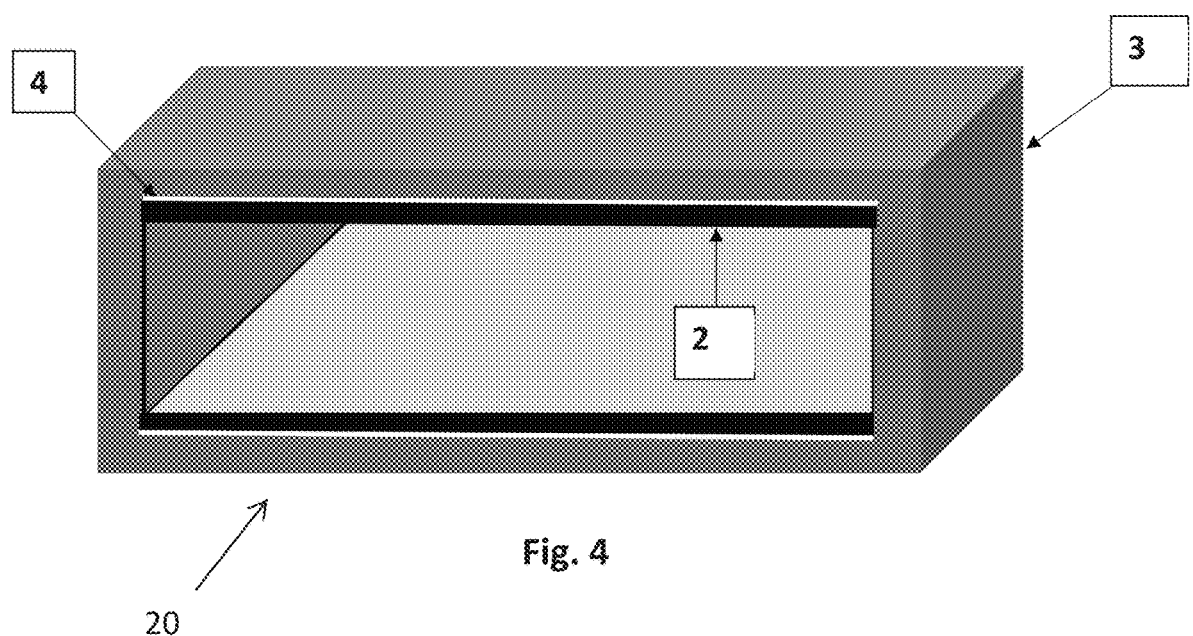
FIG. 4 is a perspective cross-sectional view of the structural column of FIG. 2 placed on its side.

In another embodiment, a bulk glass composite structural column 20 is designed to mimic the structure of timber as seen in FIGS. 2, 3, and 4. This structural column 20 is comprised of an outer non-glass sleeve 3, two parallel glass sheets 1, an inner non-glass sleeve 2, and a sizing agent or hot melt adhesive layer 4. Between the sizing agent or hot melt adhesive layer 4 and the glass sheets 1 exists a bonded joint 6 formed by the sizing agent 4 which holds the two pieces together. Additionally, there exists a bonded joint 5 between the inner non-glass sleeve 2 and the outer non-glass sleeve 3. Alternatively, between the inner non-glass sleeve 2 and the glass rods 1 there exists a friction contact point or sizing agent or hot melt adhesive layer 7 which holds the two pieces together. The three dimensional image seen in FIG. 4 provides a clearer depiction of the bulk glass composite with an outer non-glass sleeve 3, glass sheets 2, and a sizing agent or hot melt adhesive layer 4. It clearly depicts the hollow nature of the center of the bulk glass composite structural column.

Figure 5:
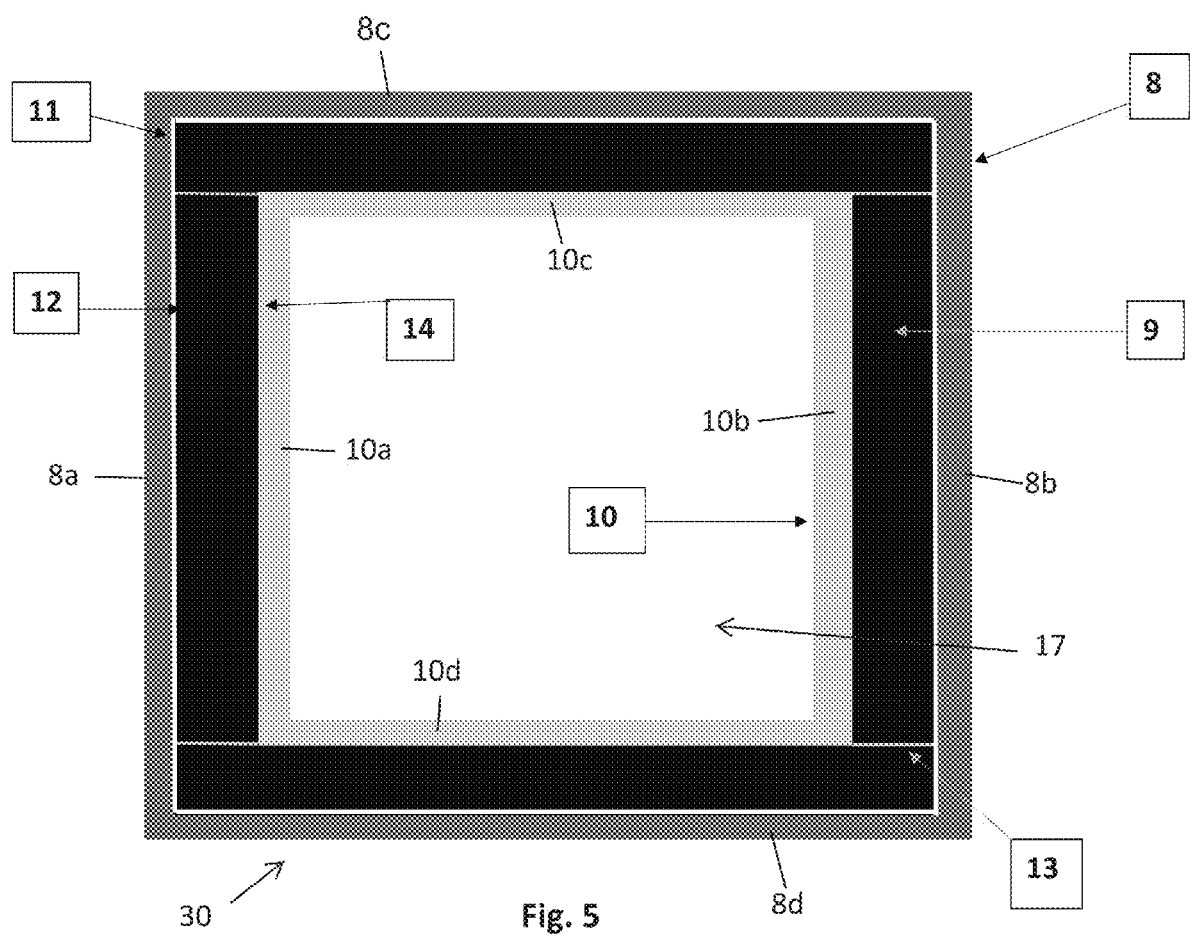
FIG. 5 is a cross-sectional view of another embodiment of a fully assembled bulk glass composite structural column that is made to mimic a steel column.
Figure 6:
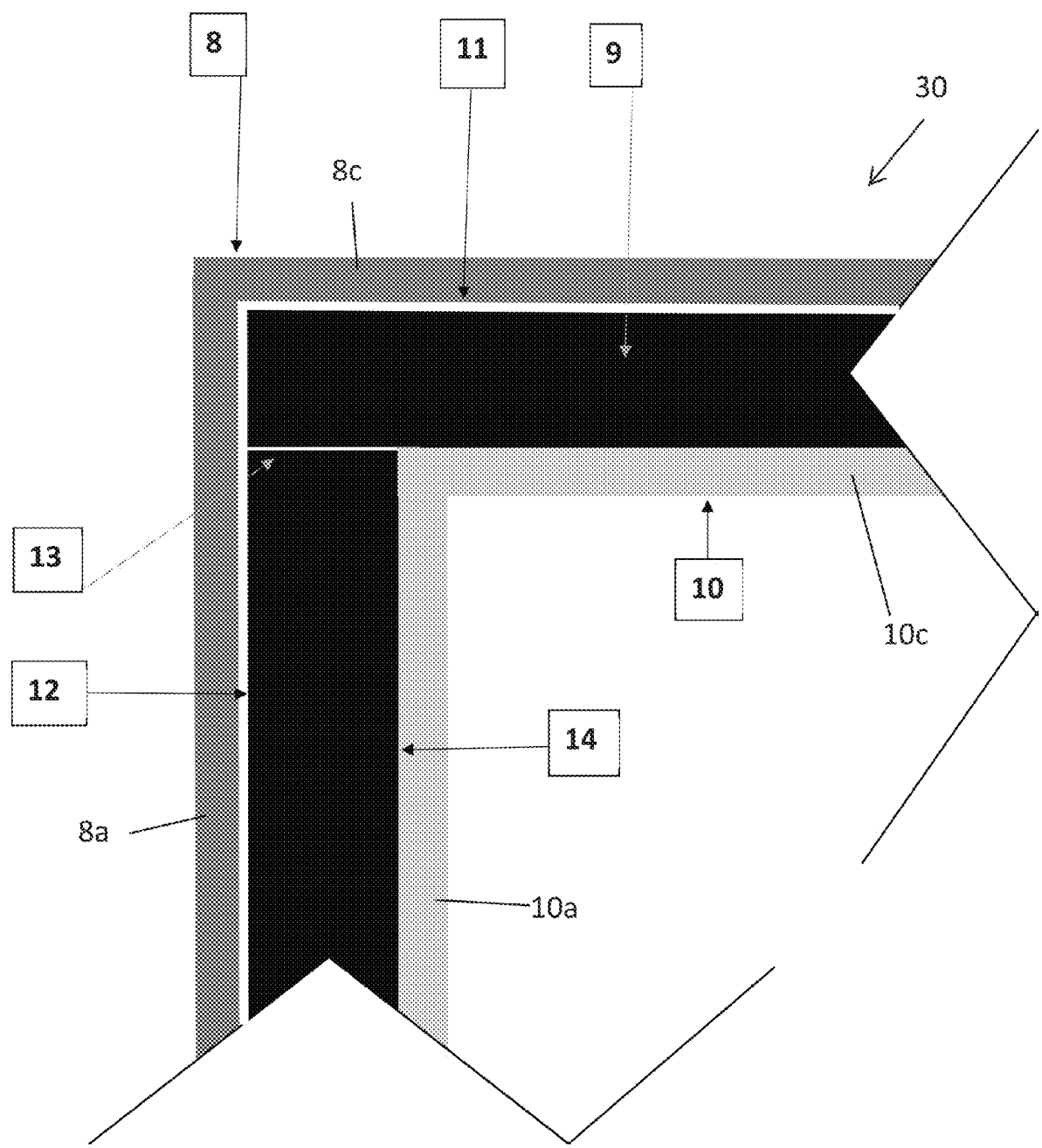
FIG. 6 is a detailed view of the structural column of FIG. 5.

In yet another embodiment, a bulk glass composite structural column 30 is designed to mimic the structure of a steel column as seen in FIGS. 5 and 6. This structural column 30 is comprised of an outer non-glass sleeve 8, four glass sheets 9 that form a rectangular shape, an inner non-glass sleeve 10, and a sizing agent or hot melt adhesive layer 11. Between the sizing agent 11 and the glass sheets 9, there exists a bonded joint 12 formed by the sizing agent or hot melt adhesive layer 11 which holds the two pieces together. Alternatively, between the inner non-glass sleeve 10 and the glass sheets 9, there exists a friction contact point or sizing agent or hot melt adhesive layer 14 which holds the two pieces together. Similarly, at the meeting point of each one of the four glass sheets 9 there exists a friction contact point or hot melt adhesive layer 13 which holds the pieces of glass together. The outer non-glass sleeve 8 comprises a first wall 8a spaced apart from an opposite second wall 8b, and a third wall 8c spaced apart from an opposite fourth wall 8d. The first wall 8a, the second wall 8b, the third wall 8c, and the fourth wall 8d of the outer sleeve 8 are arranged such that the outer sleeve 8 has a rectangular shape in cross-section. The inner sleeve 10 comprises a first wall 10a spaced apart from an opposite second wall 10b, and a third wall 10c spaced apart from an opposite fourth wall 10d. The first wall 10a, the second wall 10b, the third wall 10c, and the fourth wall 10d of the inner sleeve 10 are arranged such that the inner sleeve 10 has a rectangular shape in cross-section. The inner sleeve 10 defines a hollow interior space 17 of the structural column 30.

The invention provides a structural column comprising an inner sleeve comprising a first non-glass material, at least one sheet comprising bulk glass, and an outer sleeve comprising a second non-glass material. The inner sleeve comprises at least one wall, and the inner sleeve has an outer surface and an inner surface defining a hollow interior space of the structural column. An inner surface of each sheet is adjacent to at least a portion of the outer surface of the inner sleeve. The outer sleeve comprises at least one wall, and an inner surface of the outer sleeve is attached to at least a portion of an outer surface of each sheet, and the inner surface of the outer sleeve is attached to at least a portion of the outer surface of the inner sleeve.

In one form of the structural column, the inner sleeve comprises a first wall spaced apart from an opposite second wall, and a third wall spaced apart from an opposite fourth wall, the first wall, the second wall, the third wall, and the fourth wall of the inner sleeve being arranged such that the inner sleeve has a rectangular shape in cross-section, the outer sleeve comprises a first wall spaced apart from an opposite second wall, and a third wall spaced apart from an opposite fourth wall, the first wall, the second wall, the third wall, and the fourth wall of the outer sleeve being arranged such that the outer sleeve has a rectangular shape in cross-section, a first sheet comprising the bulk glass is adjacent to the first wall of the inner sleeve and the first wall of the outer sleeve, and a second sheet comprising the bulk glass is adjacent to the second wall of the inner sleeve and the second wall of the outer sleeve. The third wall of the inner sleeve can be attached to the third wall of the outer sleeve, and the fourth wall of the inner sleeve can be attached to the fourth wall of the outer sleeve.

In one form of the structural column, an end cap is positioned at an end of the outer sleeve. The end cap includes end surface for receiving a fastener. In one form of the structural column, any of a number of fixtures for attachments are included with the structural column. For example, a fixtures such as one or more electrical boxes can be attached to the longer cross sectional dimension of the structural column. Also alternative fixtures can attach to the face of the structural column (the shorter width in cross section).

In one form of the structural column, the outer sleeve has a first thickness, the first sheet and the second sheet have a second thickness, and a ratio of the first thickness to the second thickness is in a range of 1:0.3 to 1:10. The bulk glass can comprise soda lime glass, and the first non-glass material and the second non-glass material can be high-density polyethylene.

The bulk glass can comprise borosilicate glass, and the first non-glass material can be polyvinyl chloride, and the second non-glass material can be polyurethane.

In one form of the structural column, the outer sleeve has a first thickness, the first sheet and the second sheet have a second thickness, and a ratio of the first thickness to the second thickness is in a range of 1:0.3 to 1:2. In one form of the structural column, the outer sleeve has a first thickness, the first sheet and the second sheet have a second thickness, and a ratio of the first thickness to the second thickness is in a range of 1:3 to 1:10.

In one form of the structural column, the bulk glass comprises a glass selected from the group consisting of soda lime glass, borosilicate glass, fused-silica glass, aluminosilicate glass, alkali-free glass, and mixtures thereof. In one form of the structural column, the first non-glass material is selected from the group consisting of high-density polyethylene, low-density polyethylene, polyvinyl chloride, polypropylene, polyamide, nylon, polycarbonate, polyethylene terephthalate, polyurethane resin, epoxy resin, Portland cement, and mixtures thereof, and the second non-glass material is selected from the group consisting of high-density polyethylene, low-density polyethylene, polyvinyl chloride, polypropylene, polyamide, nylon, polycarbonate, polyethylene terephthalate, polyurethane resin, epoxy resin, Portland cement, and mixtures thereof. In one form of the structural column, the first non-glass material and the second non-glass material comprise the same material. The first non-glass material and the second non-glass material can be high-density polyethylene.

In one form of the structural column, the bulk glass has a first Young's modulus, the second non-glass material has a second Young's modulus, and a ratio of the first Young's modulus to the second Young's modulus is in a range of 50:1 to 130:1, or in a range of 70:1 to 110:1.

In another embodiment, the bonding joint between the outer non-glass sleeve and the bulk glass sheets is created by a sizing agent. This step is beneficial, as one ordinarily skilled in the art would know, to create a strong bond between the bulk glass sheets and the outer non-glass sleeve. The glass used in the present invention may have a sizing agent adhered to a surface thereof in order to improve adhesiveness to a polymeric matrix resin. Two major categories of polymeric matrix resin can be employed in the outer non-glass sleeve: thermoset resins and thermoplastic resins. Polyvinyl acetate, epoxy, polyester, phenolic, phenoxy, or polyurethane dispersions may be used as a sizing agent for creating a strong bond between the glass and a thermoset resin. For sizing glass to create a strong bond with thermoplastic resins, polyurethane, epoxy, phenoxy, polypropylene, and acrylic dispersions, among other chemistries, can be used.

Sizing agents may include, among other things, (1) coupling agents (e.g., acrylates, methacrylates, silanes, titanates, etc.), (2) film formers (e.g., polyolefins, polyvinyl alcohol, polyvinyl acetate, epoxy resins, vinyl ester-based resins. polyester, polyurethane, etc.), and (3) processing aids (e.g., lubricants, wetting agents, neutralizing agents, antistatic agents, antioxidants, nucleating agents, crosslinkers, and any combination thereof). A majority of the sizing agent formula may be film formers, which play a role in creating a strong bond between the glass and the resin.

A type of the sizing agent can be appropriately selected depending on types of the glass and the polymeric matrix resin. For example, polyolefin resins (e.g., polyethylene and polypropylene, etc.) may require different sizing agents than those used in nylon and thermoplastic polyester composites in order to bond the glass and resin. Due to the non-polar nature of polyolefin resins, it may be difficult to achieve the same degree of affinity or reactivity using polyurethane or epoxy dispersions as film-formers compared to that observed when used with nylon and polyester resins. Thus, polyethylene or polypropylene dispersions or emulsions may be selected as the sizing agent for use on glass reinforcement of polyolefins, with acid-grafted or maleic anhydride-grafted polyethylene or polypropylene dispersions or emulsions being preferred. These polyethylene and polypropylene dispersions or emulsions can provide for bonding between the glass and polyolefin resin. One example would be Michem® Emulsion 93135M, a high density polyethylene emulsion sizing agent that is polyethylene compatible. Alternatively, a sizing agent including at least one of a polyvinyl alcohol, an ethylene/vinyl alcohol copolymer, a silane-grafted polyvinyl alcohol and a silane-grafted ethylene/vinyl alcohol copolymer may be selected as the sizing agent for use on glass reinforcement of polyolefins.

In another embodiment, the bonding joint between the outer non-glass sleeve and the bulk glass sheets is created by hot melt adhesive. These adhesives can be used in temporarily high temperature applications such as polymer extrusion processes. The hot melt adhesive can be selected from the group consisting of ethylene vinyl acetate, polyethylene, metallocene, amorphous poly alpha olefins, and polyamides. The layering order of the composites is integral to the structural integrity of the structural column. The inner non-glass sleeve provides support during the over-jacketing extrusion process. The bulk glass sheets provide the actual compressive strength of the composite structural column or post as well as stiffness. The outer non-glass sleeve provides buckling strength by forcing the glass sheets to behave as an aggregate shape. The sizing agent provides adhesion between the outer non-glass sleeve and the glass sheets. An optional adhesive agent between the outer non-glass sleeve and the sizing agent provides additional bonding between the outer non-glass sleeve and the sizing agent. Although the non-glass sleeves are necessary components of the composite, they contribute very little compressive strength and serve only to support the glass. Additionally, the ratio of bulk glass to non-glass material must be carefully considered so as to keep the cost of production low. As such, a weight ratio of bulk glass to a total of the first non-glass material and the second non-glass material is from about 0.058:1 to about 6.75:1.

An adhesive agent can be used for attaching each sheet to the outer surface of the inner sleeve. The adhesive agent can be selected from the group consisting of epoxy adhesives, silicone adhesives, urethane adhesives, acrylic adhesives, and mixtures thereof. In one non-limiting embodiment of the structural column or post, the inner sleeve has a rectangular shape in cross-section, the outer sleeve has a rectangular shape in cross-section, the bulk glass comprises soda lime glass, and the first non-glass material and the second non-glass material are high-density polyethylene. The structural column is a cost competitive material when compared against both structural timbers and structural steel. The structural column can be prepared by an over-jacketing extrusion process.

The invention also provides a method for preparing a structural column. The method can include the steps of: (a) providing an inner sleeve comprising a first non-glass material wherein the inner sleeve comprises at least one wall, the inner sleeve having an outer surface and an inner surface defining a hollow interior space of the inner sleeve; (b) placing at least one sheet comprising bulk glass adjacent to at least a portion of the outer surface of the inner sleeve; and (c) forming by over-jacketing extrusion an outer sleeve comprising a second non-glass material over at least a portion of an outer surface of each sheet such that an inner surface of the outer sleeve is attached to at least a portion of an outer surface of each sheet and the inner surface of the outer sleeve is attached to at least a portion of the outer surface of the inner sleeve.

In the method, the over-jacketing extrusion step can comprise advancing a longitudinal axis of the inner sleeve perpendicularly to an axis of an extrusion screw that moves the second non-glass material. The outer sleeve can have a first thickness, the first sheet and the second sheet can have a second thickness, and a ratio of the first thickness to the second thickness can be in a range of 1:0.3 to 1:10. The bulk glass can comprise soda lime glass, and the first non-glass material and the second non-glass material can be high-density polyethylene. The bulk glass can comprise borosilicate glass, and the first non-glass material can be polyvinyl chloride, and the second non-glass material can be polyurethane.

An important feature of the invention is its low cost of production compared to its commonly used counter-parts with an estimated 11% lower cost than typical timber construction members and an estimated 50% lower cost than similarly strong structural steel. It also shows superior compressive strength over fiberglass composites which only show significant tensile strength.

Another important differentiating aspect of the invention is its resistance to degradation compared to its commonly used counter-parts. Timber is prone to degradation due to rot or destruction by wood-eating animals (e.g. termites, carpenter bees, etc.), and steel is prone to degradation due to rust, especially upon repeated exposure to water such as in the case of bridges. Because of the nature of the composite, it is much less prone to degradation via wood-eating animals, water, or other weathering.

The structural columns of the invention have many uses. Non-limiting example uses include:
Residential Construction (Lumber Replacement);
Commercial Construction (Steel Stud Replacement);
Electrical Power Poles (Both Lumber and Steel Replacement);
Manufactured/Mobile Home Construction;
Fence Posts;
Marine Applications; and
Cross Ties for Railroads.

EXAMPLES

The following Examples are provided in order to demonstrate and further illustrate certain embodiments and aspects of the present invention and are not to be construed as limiting the scope of the invention.

Example 1

Overview of Example 1

The cost of construction has been increasing, stemming mostly from increased material costs. One potential method to address this issue is the introduction of novel composites for use in structural applications. Bulk glass may prove to be a superior compositing material due to its low cost and high strength. The introduction of bulk soda-lime glass to structural applications is nontrivial; due to glass' unique properties, such as its relatively low Young's modulus (when compared to steel) and brittleness, compositing glass has proven difficult. A novel concept of a glass-reinforced composite column (GRCC) is introduced in this Example 1 that works to benefit from glass' unique properties for structural applications. The results indicate that GRCCs can be designed that have costs that are estimated to be 11% less than typical timber construction members. Additionally, GRCCs are estimated to provide a 50% cost advantage over similarly strong structural steel sections. By interpreting the results of finite element modeling, which was conducted iteratively to form buckling load to cost curves, three regions were identified that occur as the glass percentage is increased. These regions also exist with columns made of other materials (such as steel). Additionally, the finite element modeling (FEM)-determined shear stresses have smaller values than the shear strengths of typical sizing agents. In conclusion, GRCCs provide significant cost advantages (up to 50% cost reduction) over steel, and slight cost advantages when compared to structural timbers, although GRCCs have the added benefit of comprising non-degrading materials.

1. Introduction

The concept of bulk glass reinforcement has been introduced for structural systems as a material that can provide lower construction costs when compared against conventional construction materials [Ref 1]. The cost advantage occurs due to glass' large compressive strength (1000 MPa [Ref. 2]; >1100 MPa for fused quartz [Ref 3]). When comparing glass directly against other materials, glass can appear more attractive, providing costs that are 20% that of equivalent strength concrete and 5% that of equivalent strength steel [Ref. 1]. However, designing structural elements around the particularities of glass has proven difficult, stemming from glass' relatively low Young's modulus, which is also an issue for pultruded glass fiber reinforced polymers [Ref 4].

This Example 1 is in distinction dissimilar to pultruded glass fiber reinforced polymers, such as the focus of studies in References 5-8. Instead, the glass is presented as a lower-cost bulk cast glass. While pultruded glass fiber composites have their uses, the focus of this Example 1 is instead on composites that can be economically designed when compared against standard construction materials.

This Example 1 assumes that an acceptable bond can be held between the glass and polymers (specifically, high-density polyethylene adhering to soda-lime glass). This could be accomplished by a sizing agent; these chemicals, when applied to glass, allow resins to adhere to them [Ref 9]. These are utilized in the glass-fiber industry. This is required to allow the polymers to effectively contribute to the buckling resistance of glass by compositing the glass into a matrix with the polymer [Ref. 10]. Without such agents, the glass will buckle prematurely as the frictional resistance between glass and the supporting polymers will be very low. Special care must be taken when selecting a sizing agent, as it needs to be compatible with the selected polymer. One example would be Michem® Emulsion 93135M, a sizing agent that is polyethylene compatible [Ref. 11]. Hot melt adhesives can be used alternatively to develop acceptable bonds.

One advantage that glass composites may have over competing materials is that the components necessary for glass composites are non-degradable. That is, they do not rot or corrode, unlike reinforced concrete (the reinforcing steel corrodes), steel, or structural timbers. This is similar to the advantages provided by glass fiber-reinforced polymers, which also are non-degradable [Ref 12]. Additionally, by securing a cap over both ends of a glass composite, the composite can be completely encased in a polymer. This may provide a competitive edge for glass composites with regard to their use in structures.

The manufacturing process for the glass composite columns (GRCCs) is an extrusion process. More specifically, an over jacketing extrusion process (sometimes called coextrusion, such as in [Ref. 13], page 683) is considered; in this process, the longitudinal axis of the reinforcing interior of the beam would be fed perpendicularly to the extrusion screw, allowing for the binder to form around the reinforcing core. These manufacturing methods are similar to pultrusion, the method sought by glass fiber-related research (e.g., [Ref. 5-8]); these manufacturing methods tend to have reduced manufacturing costs [Ref. 12], leading to more economical designs.

Load and Resistance Factor Design (LRFD) strength reduction factors (Ø) throughout this Example 1 are assumed to be 0.9. However, as concluded by Reference 14, these Ø factors may need to be reduced in certain circumstances, as they would need to be for the similar pultruded glass fiber-reinforced polymers. Therefore, the strengths referenced in this Example 1 are listed as the maximum strength of the section (Pn).

This Example 1 investigates the possibility of GRCCs providing a cost-competitive alternative to other construction materials. Sections 2 and 3 of this Example 1 investigate a 2×4 stud (nominally 2 inches by 4 inches lumber planed down to 1.5 inches by 3.5 inches, or nominally 51 mm by 102 mm planed down to 38 mm by 89 mm) replacement and Sections 4 and 5 of this Example 1 investigate the cost comparison between a series of hollow-structural-steel (HSS) section equivalents using GRCCs.

The targeted applications of GRCCs are the replacement of standard construction columns as well as applications where inert construction materials are preferred or required, such as chemical plants processing corrosive materials, power poles, and salt-water applications.

Composite 2×4 studs have been conceptualized and patented previously, such as in Reference 15. The composite studs characterized in this patent, however, did not seek to reduce costs but to increase the functionality of steel studs by compositing them with other materials. Through the finite element modeling (FEM) conducted as part of this Example 1, and using the cost assumptions presented, GRCCs is a cost competitive material when compared against both structural timbers and structural steel.

2. Analytical Design for 2×4 Douglas Fir Equivalent

To create a GRCC of similar buckling load as the buckling load of a 2×4 (38 mm×89 mm) stud, it is necessary to clearly identify the buckling load and cost of the competing material. Due to the cyclical nature of the timber market, cost comparisons can be difficult. For the purposes of this Example 1, a price of USD 525 per MBF (thousand board feet), which is equivalent to USD $222.5/m^3$, is assumed; this represents the price of kiln dried Douglas fir timber as of March 2020 [Ref. 16]. Therefore, the selected column length of 2440 mm (8 feet) results in a cost of USD 1.835 (USD) for a Douglas fir stud. This value is an intermediate price for timber; as Reference 17 indicated, the recent high for Douglas fir was USD 690 in June 2018, which would be a price of USD 2.411 per stud.

As this section suggests, the goal is the analytical design of a 2×4 Douglas fir equivalent. For purposes of comparison, both weak and strong axis bending will be compared. Accordingly the buckling loads of Douglas fir timber is summarized in Table 1.

TABLE 1

The buckling loads of various timber grades of Douglas fir.

| Grade | Weak Axis (lbs) | Weak Axis (kN) | Strong Axis (lbs) | Strong Axis (kN) |
|---|---|---|---|---|
| Select Structural | 716 | 3.18 | 3576 | 15.91 |
| No. 1 | 643 | 2.86 | 3205 | 14.26 |
| No. 2 | 601 | 2.67 | 2983 | 13.27 |
| No. 3 | 524 | 2.33 | 2412 | 10.73 |

This table compares the buckling loads of No. 3-1 and select structural lumber. Note that this table assumes a variety of Young's moduli ranging from 510,000 (3.54 GPa) to 690,000 psi (4.79 GPa), which varies with the grade of the lumber. The source for these buckling load values is Reference 18, which utilized the design requirements put forth by Reference 19,20.

Figure 7:
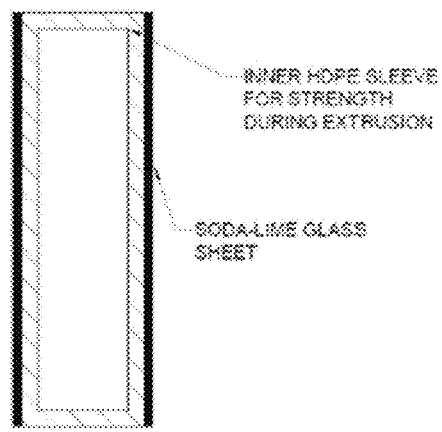
FIG. 7 shows how a glass-reinforced composite column (GRCC) is first assembled using an inner sleeve to hold the glass in place during the over jacketing extrusion process used in the Example 1 below.

Now, considering the glass columns, it should first be mentioned how the GRCCs are assumed to be constructed. An example of the composite prior to over jacket extrusion is shown in FIG. 7. In this figure, two glass plates are supported by an inner sleeve, which is a simplistic extruded high-density polyethylene (HDPE) shape. This is necessary to prevent the glass plates from pressing together during the over jacket extrusion process.

For buckling analysis, it is considered that the glass plates will not slide relative to the outside sleeve of HDPE. That is, the glass plates are assumed to be bonded to the exterior HDPE sleeve. To prove this condition, additional physical testing is necessary to be conducted. However, as Section 7. Required Bond Strengths indicates, the bonding strength necessary can likely be met with a sizing agent. These sizing agents work to bond glass to polymers, of which there exists sizing agents specifically developed to allow HDPE to adhere to soda-lime glass.

Figure 8:
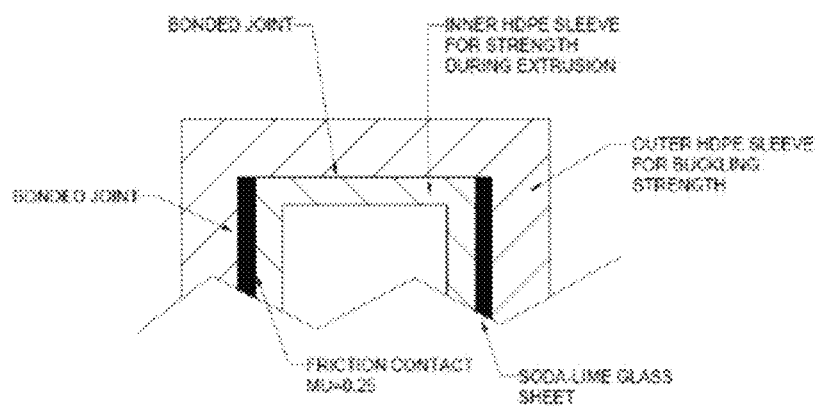
FIG. 8 shows the bonding conditions between the inner sleeve, outer sleeve, and soda-lime glass plates of the Example 1 below.

For an explanation on the specific contact conditions, see FIG. 8. The interior sleeve is considered to be unbonded to the glass plates for this analysis, and the coefficient of friction between this interior sleeve and glass plates is assumed sufficiently. The interior sleeve does serve two purposes; it provides support to the GRCC during the over jacket extrusion process, and it increases the material thickness that fasteners would be attached to.

Figure 9:
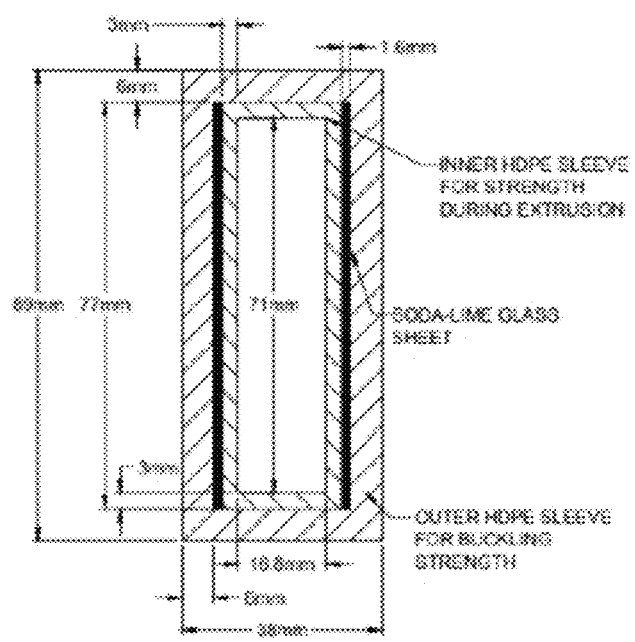
FIG. 9 shows a cross-section of the analytically designed 2×4 GRCC equivalent of the Example 1 below.

To limit the analytical analysis, a single arrangement for the GRCC will be considered. The considered dimensions are 6 mm for the exterior thickness, 3 mm for the interior thickness, and a glass sheet thickness of 1.6 mm (equivalent to 1/16 inches). This specific arrangement is shown in FIG. 9. Note that this design provides 9 mm thickness of HDPE for securing anchors to the GRCC 2×4 equivalent.

As the section behaves as a complete unit, the moments of inertia necessary to calculate the buckling load can be determined by simply considering the glass' contributions. This is appropriate as the Young's modulus of glass is 72 GPa [Ref. 21], while the Young's modulus of HDPE is only 0.8 GPa [Ref. 22]; this means the HDPE contributes little to the buckling load of the column.

The resulting calculations regarding the GRCC 89×38× 1.6×3 are shown below in Equations (A1)-(A7).

$$I_{weak\ axis}(\text{glass component}) = \quad (A1)$$
$$\bar{y}^2 A = 2(12.2\ mm)^2(77\ mm \times 1.6\ mm) = 36{,}674\ mm^4$$

$$I_{weak\ axis}(HDPE\ \text{sleeve}) = \frac{1}{12}(b_o h_o^3 - b_i h_i^3) = \quad (A2)$$
$$\frac{1}{12}[89\ mm(38\ mm)^3 - 77\ mm(26\ mm)^3] = 294{,}188\ mm^4$$

$$I_{strong\ axis}(\text{glass component}) = \quad (A3)$$
$$\frac{1}{12}bh^3 = \frac{1}{12}(2 \times 1.6mm)(77mm)^3 = 121{,}742 mm^4$$

$$I_{strong\ axis}(HDPE\ \text{sleeve}) = \frac{1}{12}(b_o h_o^3 - b_i h_i^3) = \quad (A4)$$
$$\frac{1}{12}[38\ mm(89\ mm)^3 - 26\ mm(77\ mm)^3] = 1{,}243{,}247\ mm^4$$

where $I$ is the moment of inertia,
denoted for each axis. Accordingly,
the critical buckling load for each axis is
calculated using the Euler's critical load formula
(which was originally developed by Leonhard Euler in 1757,
though [30] provides an explanation):

$$F_{cr} = \frac{\pi^2 EI}{(kL)^2} \quad (A5)$$

$$F_{cr,\ weak\ axis} = \quad (A6)$$
$$\frac{\pi^2(72\ GPa)(36{,}674\ mm^4)}{(2440\ mm^4)} + \frac{\pi^2(0.8\ GPa)(294{,}188\ mm^4)}{(2440\ mm)^2} = 4{,}768\ N$$

$$F_{cr,\ strong\ axis} = \quad (A7)$$
$$\frac{\pi^2(72\ GPa)(121{,}742\ mm^4)}{(2440\ mm)^2} + \frac{\pi^2(0.8\ GPa)(1{,}243{,}247\ mm^4)}{(2440\ mm)^2} = 16{,}163\ N$$

where $E$ is the Young's modulus of glass,
$k$ is the length correction factor,
and $L$ is the length of the column.

The calculations regarding the GRCC
125×125×3×12.5 are shown below.
First, the buckling resistance is determined by the
moment of inertia. This is calculated accordingly:

$$\bar{I} = \frac{2}{12}(12.5mm)\ (94mm)^3(12.5mm)^3 + \quad (A8)$$
$$2(53.25mm)^2(94mm \times 12.5mm) = 8{,}761{,}142 mm^4$$

This results in a GRCC with a weak axis buckling load of 4768 N and a strong axis buckling load of 16,163 N.

As can be seen, if the glass is allowed to function as a column, and not to suffer from a local buckling condition, the glass deforms as a section, resulting in significant buckling load. In fact, the calculated buckling load of the GRCC for the analytical section is equivalent in buckling load to a No. 1 Douglas fir 2×4.

Now, the costs are estimated. Considering a soda-lime glass price of USD 0.17 per kg [Ref. 23], and an HDPE cost of USD 0.25 per kg [Ref 24], the resulting estimated cost is USD 2.31. This estimated cost includes a factor of 40% of the cost for the manufacturing cost of the extrusion, as suggested by Reference 25. As over jacket extrusion is assumed for manufacturing GRCCs, but is not explicitly detailed in Ref. 25, the specific cost factoring is considered as an approximation of the true cost of GRCCs. This is at a cost disadvantage to Douglas fir timber ($1.835), costing 26% more. However, as the timber market is cyclical, prices for Douglas fir have climbed as high as $2.411 (USD) per 8-foot 2×4. Due to GRCCs non-degradability, the premium pricing may provide marketability for GRCCs. While this first analytical design is at a cost disadvantage, other designed GRCCs have costs approaching or below the price of timber, as is developed and described in the following section on finite element modeling (FEM) of GRCCs.

3. Finite Element Modeling for 2×4 Douglas Fir Equivalent

To extrapolate on the solution calculated previously, finite element modeling (FEM) is conducted. In particular, the program utilized is ANSYS 2019 R3, utilizing the Static Structural and Eigenvalue Buckling Analysis Systems. The specific reason that buckling is considered extensively is that the maximum glass stress encountered in all of the analyses is 123 MPa (which is derived from 73.9 MPa multiplied by a safety factor conversion of 1.67), a value that is 12.3% the maximum strength value for glass (glass has a strength of 1000 MPa in compression, [Ref. 2]). This means that the columns considered as part of this research of Example 1 are limited by the buckling strength and not the compressive strength of glass.

Figure 10:
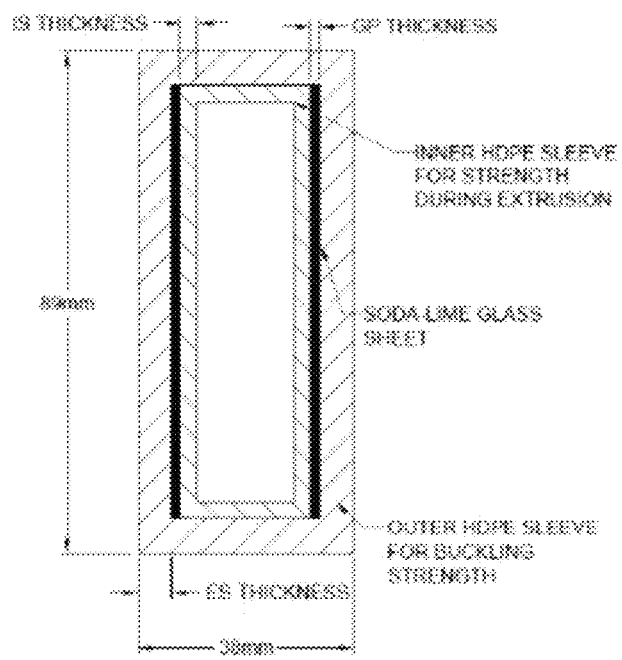
FIG. 10 shows the general shape for the 2×4 replacement columns of the Example 1 below.

The general design for the 2×4 equivalent GRCCs is shown in FIG. 10. In this figure, the thickness of the exterior (denoted ES THICKNESS) and interior (denoted IS THICKNESS) HDPE sleeves will be modulated, and the glass thicknesses (denoted GP THICKNESS) will be varied in the design.

Figure 11:
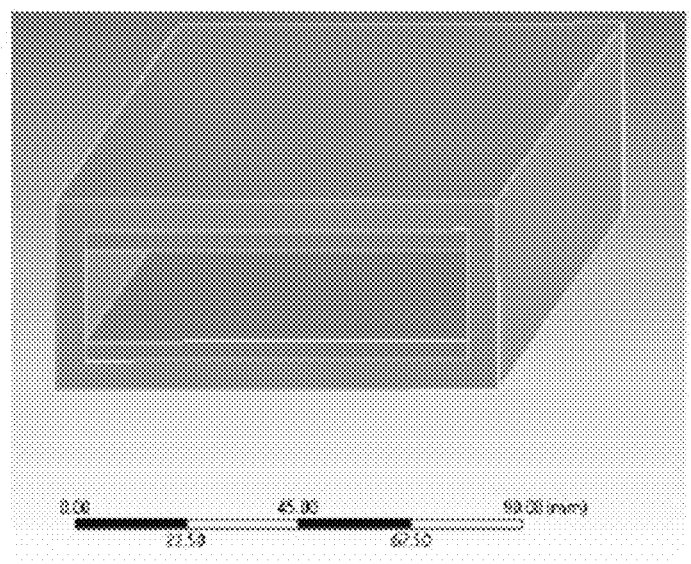
FIG. 11 shows the cross section of one of the analyzed columns (placed on its side) of the Example 1 below.

An example of the cross-section is shown in FIG. 11. One additional note is that the length of the analyzed members was reduced to ½ the selected length; this was done as the ANSYS analysis was performed as a fixed-free buckling condition; this means that the value of kL (the effective buckling length of a column) between the two analyses (between the analytical analysis required to determine the buckling loads of the timber columns and the ANSYS FEM) was equivalent (that is, kL=1.0×2.44 m=2.0×1.22 m=2.44 m).

Next, the results of the iterative analysis are shown in Table 2. In this table, the section designation is organized such that the two numbers represent the outside dimensions of the section (a standard 89 mm by 38 mm), the third number represents the exterior sleeve thickness (ES THICKNESS in FIG. 10), and the fourth number represents the glass plate thickness (GP THICKNESS in FIG. 10). A standard interior sleeve thickness of 3 mm was assumed.

TABLE 2

The resulting weak and strong axis buckling loads of the GRCCs targeting a substitution for standard 2 × 4 stud timber framing.

| Section | Analysis Mesh Size | Weak Axis Critical Buckling Load (kN) | Strong Axis Critical Buckling Load (kN) | Maximum Glass Stress (MPa) | Estimated Cost ($USD) |
|---|---|---|---|---|---|
| 89 × 38 × 3 × 1 | 12.5 mm | 4.4 | 12.3 | 73.9 | $1.63 |
| 89 × 38 × 3 × 1.6 | 12.5 mm | 6.4 | 19.0 | 71.4 | $1.80 |
| 89 × 38 × 3 × 2 | 12.5 mm | 7.5 | 23.3 | 70.1 | $1.92 |
| 89 × 38 × 3 × 3 | 12.5 mm | 10.3 | 35.0 | 70.3 | $2.20 |
| 89 × 38 × 3 × 4 | 12.5 mm | 12.0 | 37.2 | 56.0 | $2.49 |
| 89 × 38 × 6 × 1 | 12.5 mm | 3.1 | 10.7 | 69.7 | $2.15 |
| 89 × 38 × 6 × 1.6 | 12.5 mm | 4.5 | 16.2 | 65.7 | $2.31 |
| 89 × 38 × 6 × 2 | 12.5 mm | 5.3 | 19.8 | 64.3 | $2.41 |
| 89 × 38 × 6 × 3 | 12.5 mm | 7.0 | 28.9 | 62.5 | $2.68 |
| 89 × 38 × 6 × 4 | 12.5 mm | 8.4 | 38.0 | 61.6 | $2.95 |
| 89 × 38 × 9 × 1 | 12.5 mm | 2.0 | 9.3 | 65.6 | $2.62 |
| 89 × 38 × 9 × 1.6 | 12.5 mm | 2.7 | 13.6 | 59.8 | $2.77 |
| 89 × 38 × 9 × 2 | 12.5 mm | 3.1 | 16.4 | 57.8 | $2.86 |
| 89 × 38 × 9 × 3 | 12.5 mm | 4.0 | 23.5 | 55.3 | $3.11 |
| 89 × 38 × 9 × 4 | 12.5 mm | 4.6 | 28.9 | 50.9 | $3.36 |

The resulting analysis found two modes of failure among all dimensions shown in Table 2. The failure modes were gross deflection of the weak and strong axes. These can be seen in FIGS. 12 and 13.

Note that the buckling modes were gross-buckling of the GRCCs. This is in distinction to local buckling failures, which were seen in the hollow-structural-steel GRCC replacements.

Figure 14:
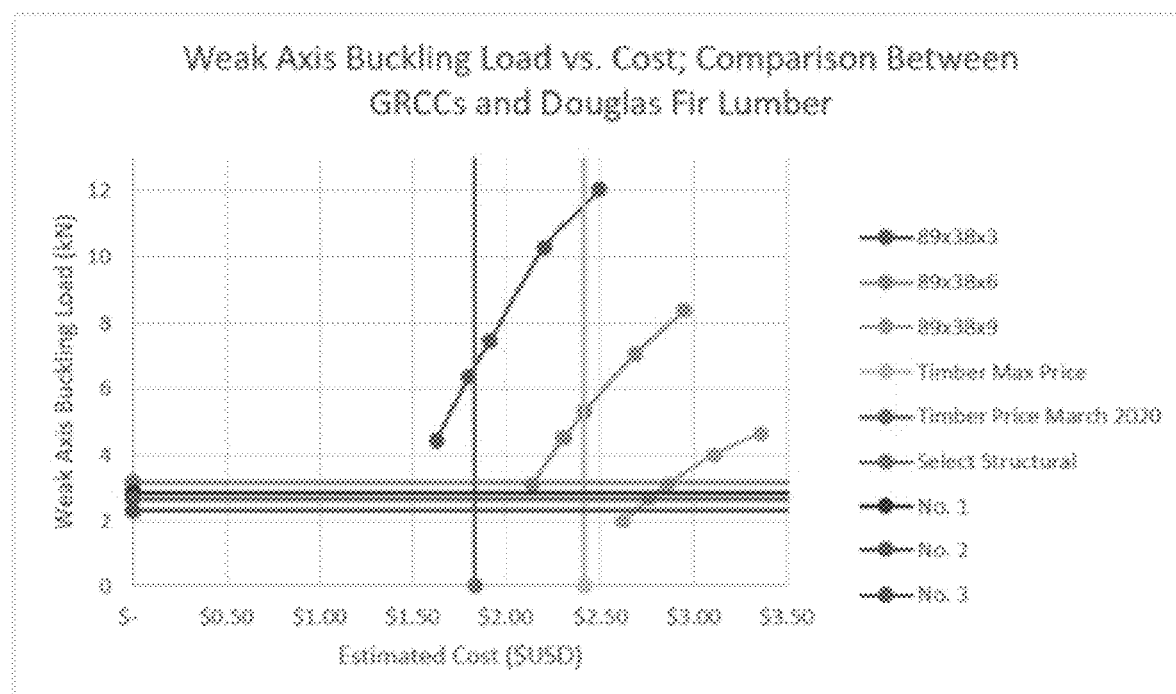
FIG. 14 shows the cost vs. buckling load comparison for the weak axis buckling comparison of the Example 1 below.
Figure 15:
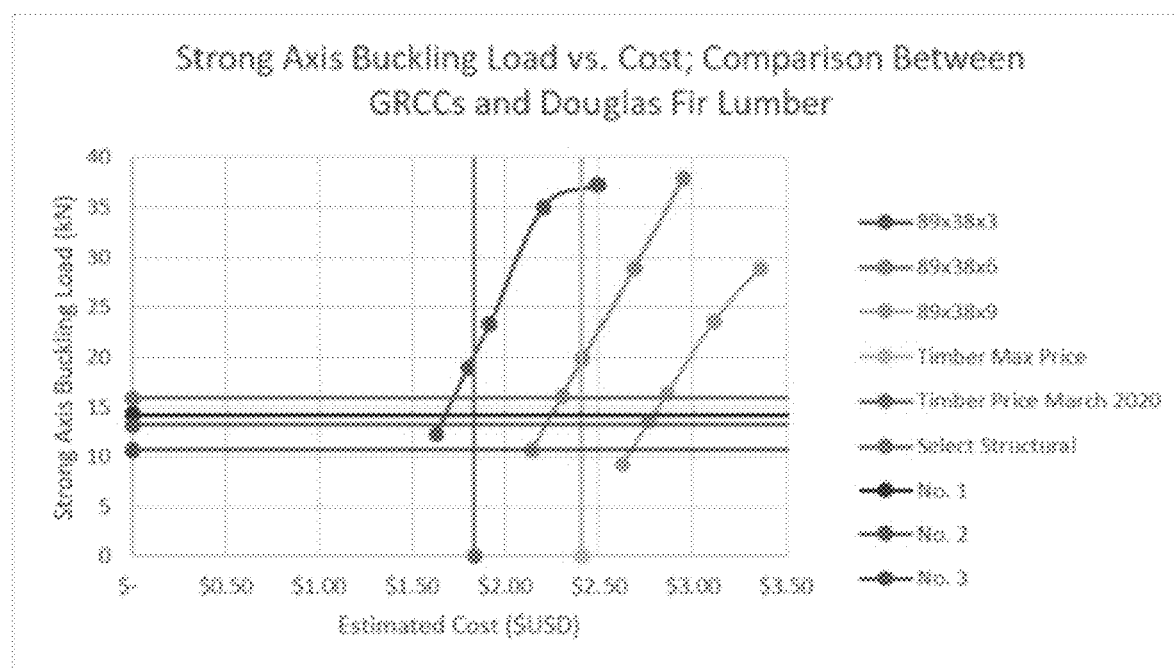
FIG. 15 shows the cost vs. strong axis buckling load comparison for the various grades of Douglas fir and the GRCC equivalents of the Example 1 below.

To better understand the findings of the FEM, graphs were developed. The data between the timber section buckling loads, timber costs, and estimated costs and buckling loads of the GRCC equivalents were collated into two figures. FIG. 14 shows the weak axis buckling load vs. cost, while FIG. 15 shows the same for the strong axis buckling. Note that the timber buckling loads are graphed as horizontal lines while the timber costs are vertical lines.

As can be seen in FIGS. 14 and 15, the most cost-effective sizes are 89×38×3 GRCCs. These can approach a price of USD 1.63 if utilizing a 1 mm glass plate thickness, which results in a cost saving of 11% over current timber prices (USD 1.835). This section, however, only beats the buckling load of No. 3 grade timber, so the glass plate thickness would need to be modulated until an acceptable design was found. The 89×38×3 GRCCs feature a 3 mm exterior sleeve. The polymer sheeting allows for fasteners to attach to the GRCC. The total thickness of the 89×39×3 GRCCs is 6 mm (3 mm from the exterior, 3 mm from the interior sleeve).

4. Analytical Design for 5×5×⅛ Steel Equivalent

As it would be insufficient to only calculate and compare buckling loads of GRCCs against timber structural members, a similar comparison analysis will also be performed for a GRCC that matches the requirements of buckling load as an hollow-structural-steel (HSS) 5×5×⅛ (the metric equivalent being HSS 127×127×3.2). For this shape, the maximum load (assuming LRFD design) is 355 kN (note that this is the value of Pn, the nominal buckling load without the 0.9 reduction factor). For this shape, an equivalent GRCC is designed.

Figure 16:
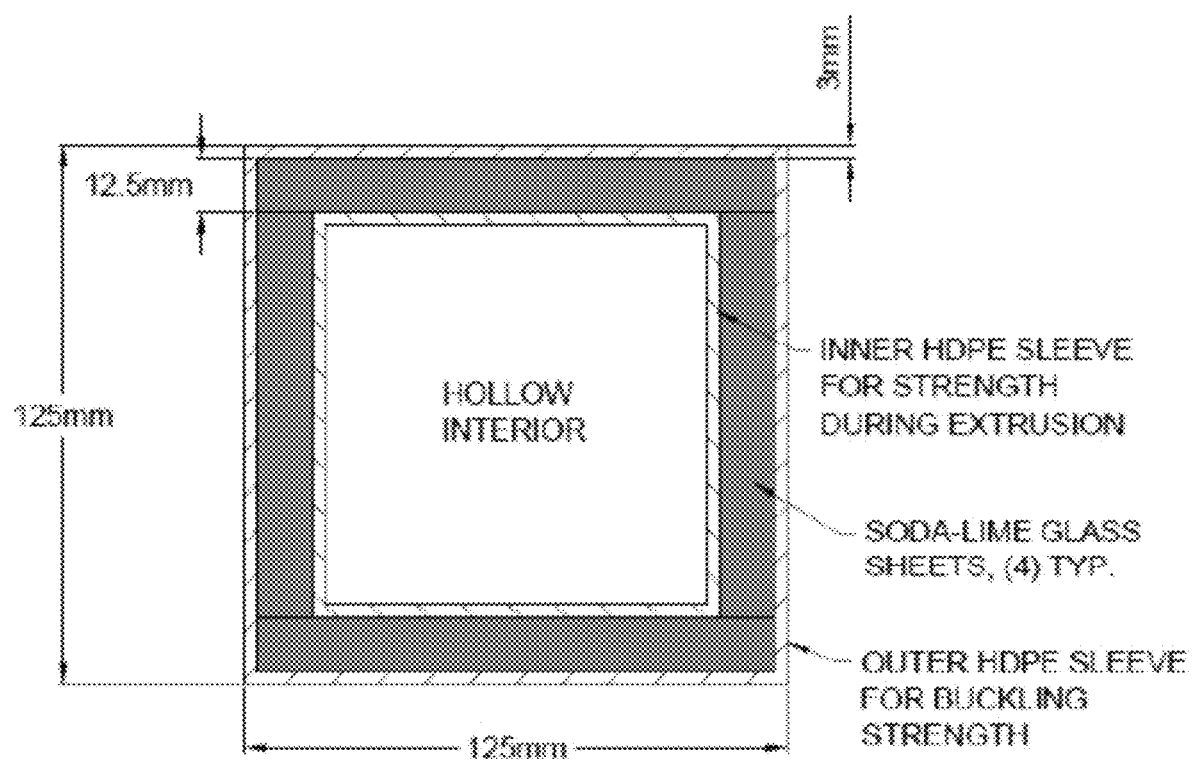
FIG. 16 shows the cross-section of the selected GRCC for equivalent buckling load as a hollow-structural-steel (HSS) 5×5×⅛ of the Example 1 below.

The selected GRCC is a 125 mm×125 mm section with 12.5 mm thickness glass sheets. A standard sleeve thickness of 3 mm is assumed for both the interior and exterior HDPE sleeves. An example of the selected member is shown in FIG. 16. Note that the design features four glass plates of varying widths, unlike the two glass plates utilized for the equivalent stud GRCC. As with the previous GRCCs, it is necessary for the HDPE sleeve to bond to the glass sheet.

First, the costs of the steel need to be presented. Based on a current steel price of USD 0.77 per kg [Ref. 26], and assuming A36 plate prices are equivalent to A500 grade B (which is what hollow structural steel sections are typically composed of), the resulting prices for the selected sections for comparison are shown in Table 3.

TABLE 3

The costs assumed for the steel sections. This is based on a current (as of 1 Apr. 2020) price of steel plate of USD 0.77 per kg. The assumed column length is 3050 mm (10 feet).
Steel Sections

| Section (Standard Designation) | Section (Metric Designation) | Pn (kN) | Estimated Cost ($USD) |
|---|---|---|---|
| HSS 2 × 2 × 1/8 | HSS 50.8 × 50.8 × 3.2 | 37.71 | $ 9.92 |
| HSS 2 × 2 × 3/16 | HSS 50.8 × 50.8 × 4.8 | 49.92 | $ 14.05 |
| HSS 2 × 2 × 1/4 | HSS 50.8 × 50.8 × 6.4 | 57.83 | $ 17.83 |
| HSS 2.25 × 2.25 × 1/8 | HSS 57.2 × 57.2 × 3.2 | 55.36 | $ 11.29 |
| HSS 2.25 × 2.25 × 3/16 | HSS 57.2 × 57.2 × 4.8 | 74.14 | $ 16.18 |
| HSS 2.25 × 2.25 × 1/4 | HSS 57.2 × 57.2 × 6.4 | 87.48 | $ 20.56 |
| HSS 2.5 × 2.5 × 1/8 | HSS 63.5 × 63.5 × 3.2 | 77.60 | $ 12.64 |
| HSS 2.5 × 2.5 × 3/16 | HSS 63.5 × 63.5 × 4.8 | 104.78 | $ 18.20 |
| HSS 2.5 × 2.5 × 1/4 | HSS 63.5 × 63.5 × 6.4 | 126.03 | $ 23.28 |
| HSS 2.5 × 2.5 × 5/16 | HSS 63.5 × 63.5 × 7.9 | 141.35 | $ 27.78 |
| HSS 3 × 3 × 1/8 | HSS 76.2 × 76.2 × 3.2 | 131.47 | $ 15.37 |
| HSS 3 × 3 × 3/16 | HSS 76.2 × 76.2 × 4.8 | 183.86 | $ 22.35 |
| HSS 3 × 3 × 1/4 | HSS 76.2 × 76.2 × 6.4 | 228.34 | $ 28.85 |
| HSS 3 × 3 × 5/16 | HSS 76.2 × 76.2 × 7.9 | 263.43 | $ 34.77 |
| HSS 3 × 3 × 3/8 | HSS 76.2 × 76.2 × 9.5 | 291.11 | $ 40.10 |
| HSS 3.5 × 3.5 × 1/8 | HSS 88.9 × 88.9 × 3.2 | 187.81 | $ 18.22 |
| HSS 3.5 × 3.5 × 3/16 | HSS 88.9 × 88.9 × 4.8 | 267.88 | $ 26.50 |
| HSS 3.5 × 3.5 × 1/4 | HSS 88.9 × 88.9 × 6.4 | 340.04 | $ 34.43 |
| HSS 3.5 × 3.5 × 5/16 | HSS 88.9 × 88.9 × 7.9 | 401.82 | $ 41.66 |
| HSS 3.5 × 3.5 × 3/8 | HSS 88.9 × 88.9 × 9.5 | 454.21 | $ 48.41 |
| HSS 4 × 4 × 1/8 | HSS 101.6 × 101.6 × 3.2 | 245.15 | $ 20.95 |
| HSS 4 × 4 × 3/16 | HSS 101.6 × 101.6 × 4.8 | 253.38 | $ 30.55 |
| HSS 4 × 4 × 1/4 | HSS 101.6 × 101.6 × 6.4 | 453.72 | $ 39.90 |
| HSS 4 × 4 × 5/16 | HSS 101.6 × 101.6 × 7.9 | 543.67 | $ 48.55 |
| HSS 4 × 4 × 3/8 | HSS 101.6 × 101.6 × 9.5 | 622.75 | $ 56.61 |
| HSS 4 × 4 × 1/2 | HSS 101.6 × 101.6 × 12.7 | 756.19 | $ 71.31 |
| HSS 5 × 5 × 1/8 | HSS 127 × 127 × 3.2 | 355.36 | $ 26.42 |
| HSS 5 × 5 × 3/16 | HSS 127 × 127 × 4.8 | 523.90 | $ 38.86 |
| HSS 5 × 5 × 1/4 | HSS 127 × 127 × 6.4 | 677.11 | $ 50.95 |
| HSS 5 × 5 × 5/16 | HSS 127 × 127 × 7.9 | 825.39 | $ 62.34 |
| HSS 5 × 5 × 3/8 | HSS 127 × 127 × 9.5 | 958.83 | $ 73.25 |
| HSS 5 × 5 × 1/2 | HSS 127 × 127 × 12.7 | 1201.01 | $ 93.41 |
| HSS 6 × 6 × 1/8 | HSS 152.4 × 152.4 × 3.2 | 403.30 | $ 32.01 |
| HSS 6 × 6 × 3/16 | HSS 152.4 × 152.4 × 4.8 | 682.06 | $ 47.19 |
| HSS 6 × 6 × 1/4 | HSS 152.4 × 152.4 × 6.4 | 899.53 | $ 62.14 |
| HSS 6 × 6 × 5/16 | HSS 152.4 × 152.4 × 7.9 | 1097.22 | $ 76.26 |
| HSS 6 × 6 × 3/8 | HSS 152.4 × 152.4 × 9.5 | 1285.04 | $ 89.91 |
| HSS 6 × 6 × 1/2 | HSS 152.4 × 152.4 × 12.7 | 1640.89 | $115.55 |
| HSS 6 × 6 × 5/8 | HSS 152.4 × 152.4 × 15.9 | 1952.27 | $138.82 |

The selected design for comparison is an HSS 127×127×3.2 (HSS 5×5×⅛). For this section, the unreduced buckling load is 355.36 kN.

Now, the equivalent buckling load GRCC is designed. The selected GRCC is a 125 mm×125 mm section with 12.5 mm thickness glass sheets and an HDPE sleeve of 3 mm (which is designated a 125×125×3×12.5). As before, the section is assumed to deform as a solid component. This results in the glass not locally buckling but deforming the entire column as a complete unit. For the purposes of the analytical design, the frictional contact between the glass plates will not be considered for analysis.

The calculations regarding the GRCC 125×125×3×12.5 are shown below in Equations (A8) and (A9).

First, the buckling resistance is determined by the moment of inertia. This is calculated accordingly:

$$I = \frac{2}{12}(12.5\text{mm})(94\text{mm})^3 + \frac{2}{12}(94\text{mm})(12.5\text{mm})^3 + \\ 2(53.25\text{mm})^2(94\text{mm} \times 12.5\text{mm}) = 8{,}761{,}142\text{mm}^4 \quad (A8)$$

Next, the critical load is calculated according to Equation (A3):

$$F_{cr} = \frac{\pi^2(72\ GPa)(8{,}761{,}142\ \text{mm}^4)}{(3050\ \text{mm})^2} = 669\ kN \quad (A9)$$

This results in a GRCC with a 669 kN.

However, due to the complex interaction between the glass plates, this critical load calculated analytically is proven to be incorrect in the finite element section. That being said, the FEM-determined buckling load surpasses the HSS buckling load of 355.36 kN. An explanation for the difference in buckling load is presented in the following section.

Additionally, using the same cost assumptions as before, the cost of the GRCC 125 mm×125 mm with 12.5 mm glass plates is USD 15.12; this is significantly lower than the HSS 127×127×3.2 (HSS 5×5×⅛) at a cost of USD 26.42. This would be a cost saving of 43% over the equivalent steel section.

5. Finite Element Modeling for 5×5×⅛ Steel Equivalent

Figure 17:
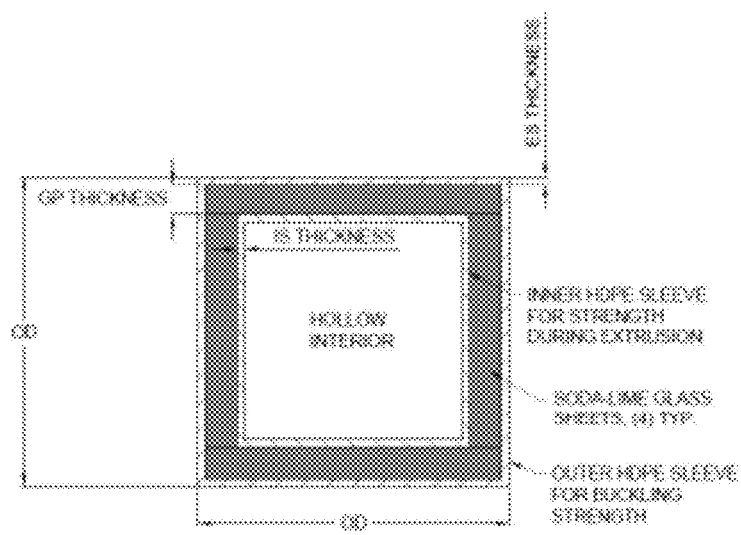
FIG. 17 shows the general arrangement of the GRCC that works as a replacement for HSS columns of the Example 1 below.

As before, FEM was conducted of iterative designs to showcase the variety of buckling loads and costs possible for GRCCs. FEM was conducted using ANSYS 2019 R3's Static Structural and Eigenvalue Buckling Analysis Systems. Before displaying the FEM determined results, it is necessary to describe the standardized shape. FIG. 17 below shows the shape that was modulated. As before, there are four primary measurements; the outside dimensions (denoted OD), the exterior sleeve thickness (denoted ES THICKNESS), the glass plate thickness (denoted GP THICKNESS), and the interior sleeve thickness (denoted IS THICKNESS).

Figure 18:
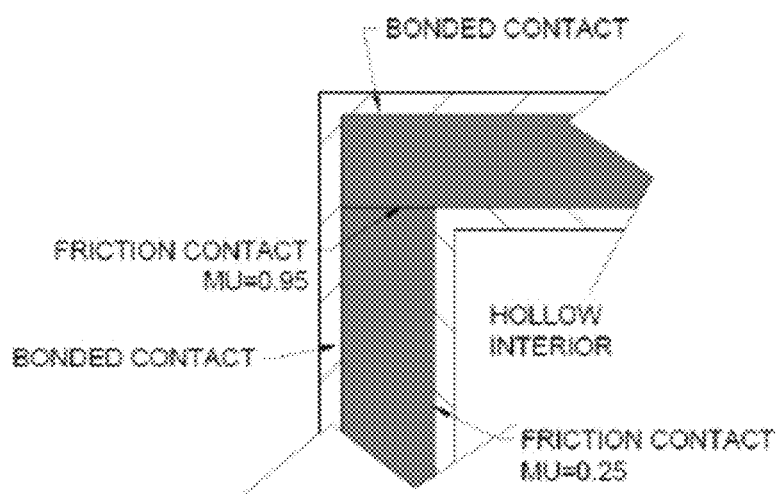
FIG. 18 shows the contact conditions that are shown on the upper-left portion of FIG. 17, for the various components of the GRCCs considered in the Example 1 below.

An explanation of the contact conditions for the GRCCs analyzed using FEM are presented in FIG. 18. The inner contact with a frictional coefficient of 0.25 (the inventors' estimate) is not reflected in the FEM as the inner sleeves were excluded from the analysis (as they contribute a negligible amount of buckling load). The glass plates have a coefficient of friction of 0.95 [Ref. 27] between them.

Next, the results of the FEM are listed in Table 4. In this table, the mesh size, maximum buckling load, maximum glass stress, and estimated cost are listed. Note that while two modes of buckling were calculated, only the first mode is reported. This table presents an issue with the analytically determined buckling load of the 125×125×3×12.5; the analytical buckling load was calculated as 669 kN and the FEM resulted in a buckling load of 425 kN. The difference between these two values is thought to derive from the inclusion of the frictional joint between the glass plates (as shown in FIG. 18). This frictional joint, which is intrinsically assumed as bonded in the analytical section, significantly reduces the buckling load of the section. As the FEM can account for this interaction while the analytical does not, the results from the FEM are considered more accurate. In Table 4, the mesh sizes, buckling loads, maximum glass stresses, and estimated costs are presented for the finite element modeling (FEM) GRCCs. Note that the designation is OD×OD×ES×GP (see FIG. 17 for references to the dimensions).

TABLE 4

| GRCC Section | Mesh Size | Pn (kN) | Maximum Glass Stress (MPa) | Estimated Cost ($USD) |
|---|---|---|---|---|
| 150 × 150 × 3 × 25 | 25 | 968.4 | 81.4 | $30.15 |
| 150 × 150 × 3 × 19 | 25 | 865.1 | 91.1 | $24.93 |
| 150 × 150 × 3 × 12.5 | 25 | 733.5 | 111.6 | $18.57 |
| 150 × 150 × 3 × 9.5 | 25 | 590.0 | 115.4 | $15.38 |
| 150 × 150 × 3 × 6 | 25 | 304.3 | 91.9 | $11.46 |
| 150 × 150 × 3 × 3 | 25 | 81.7 | 48.3 | $ 7.94 |
| 125 × 125 × 3 × 25 | 25 | 492.6 | 52.4 | $23.99 |
| 125 × 125 × 3 × 19 | 25 | 486.9 | 64.1 | $20.07 |
| 125 × 125 × 3 × 12.5 | 25 | 425.3 | 79.9 | $15.12 |
| 125 × 125 × 3 × 9.5 | 25 | 363.8 | 87.4 | $12.59 |
| 125 × 125 × 3 × 6 | 25 | 230.4 | 84.9 | $ 9.43 |
| 125 × 125 × 3 × 3 | 25 | 84.3 | 60.6 | $ 6.56 |
| 100 × 100 × 3 × 25 | 25 | 213.9 | 31.0 | $17.83 |
| 100 × 100 × 3 × 19 | 25 | 214.2 | 37.6 | $15.21 |
| 100 × 100 × 3 × 12.5 | 25 | 196.7 | 48.3 | $11.68 |
| 100 × 100 × 3 × 9.5 | 25 | 171.0 | 53.3 | $ 9.80 |
| 100 × 100 × 3 × 6 | 25 | 123.7 | 58.6 | $ 7.41 |
| 100 × 100 × 3 × 3 | 25 | 75.5 | 69.1 | $ 5.19 |
| 90 × 90 × 3 × 25 | 25 | 133.3 | 22.6 | $15.36 |
| 90 × 90 × 3 × 19 | 25 | 139.8 | 28.3 | $13.27 |
| 90 × 90 × 3 × 12.5 | 25 | 136.9 | 38.3 | $10.30 |
| 90 × 90 × 3 × 9.5 | 25 | 118.1 | 41.7 | $ 8.68 |
| 90 × 90 × 3 × 6 | 25 | 86.7 | 46.3 | $ 6.59 |
| 90 × 90 × 3 × 3 | 25 | 58.3 | 60.0 | $ 4.63 |
| 75 × 75 × 3 × 25 | 25 | 77.2 | 17.5 | $11.66 |
| 75 × 75 × 3 × 19 | 25 | 72.6 | 19.1 | $10.35 |
| 75 × 75 × 3 × 12.5 | 25 | 73.4 | 26.0 | $ 8.23 |
| 75 × 75 × 3 × 9.5 | 25 | 62.3 | 27.6 | $ 7.01 |
| 75 × 75 × 3 × 6 | 25 | 48.8 | 32.3 | $ 5.38 |
| 75 × 75 × 3 × 3 | 25 | 34.0 | 42.9 | $ 3.81 |
| 50 × 50 × 3 × 19 | 25 | 24.0 | 12.7 | $ 5.50 |
| 50 × 50 × 3 × 12.5 | 25 | 23.2 | 14.7 | $ 4.79 |
| 50 × 50 × 3 × 9.5 | 25 | 21.6 | 16.4 | $ 4.21 |
| 50 × 50 × 3 × 6 | 25 | 17.4 | 19.0 | $ 3.35 |
| 50 × 50 × 3 × 3 | 25 | 10.8 | 21.9 | $ 2.43 |

Figure 19:
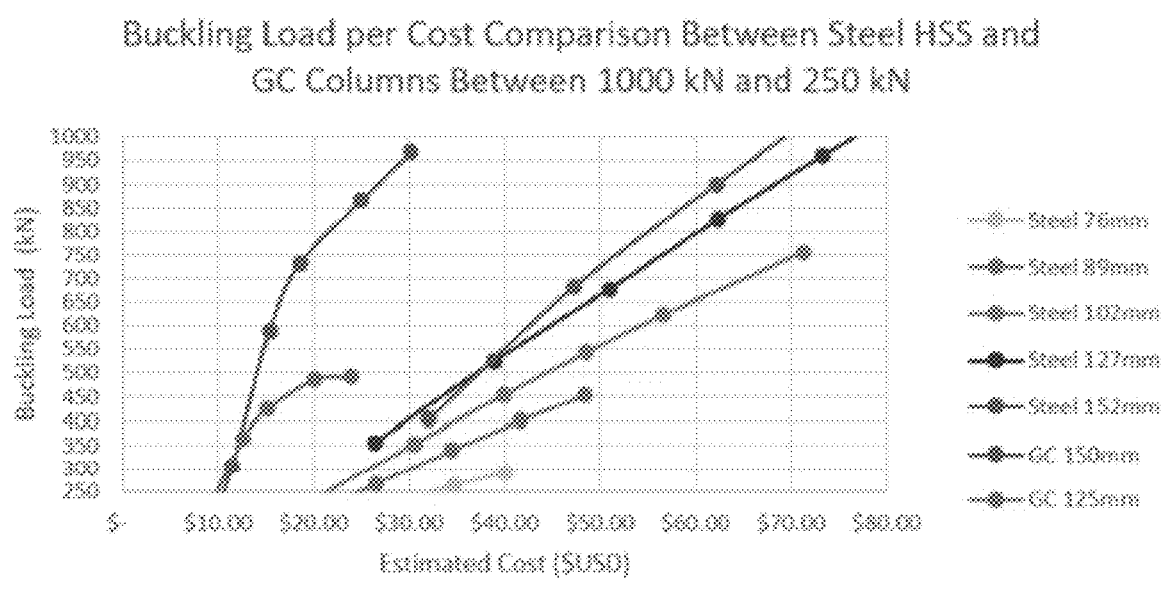
FIG. 19 shows the cost vs. buckling load comparison between the hollow-structural-steel (HSS) sections and the GRCCs of the Example 1 below. This figure covers the buckling loads for 1000 to 250 kN.
Figure 20:
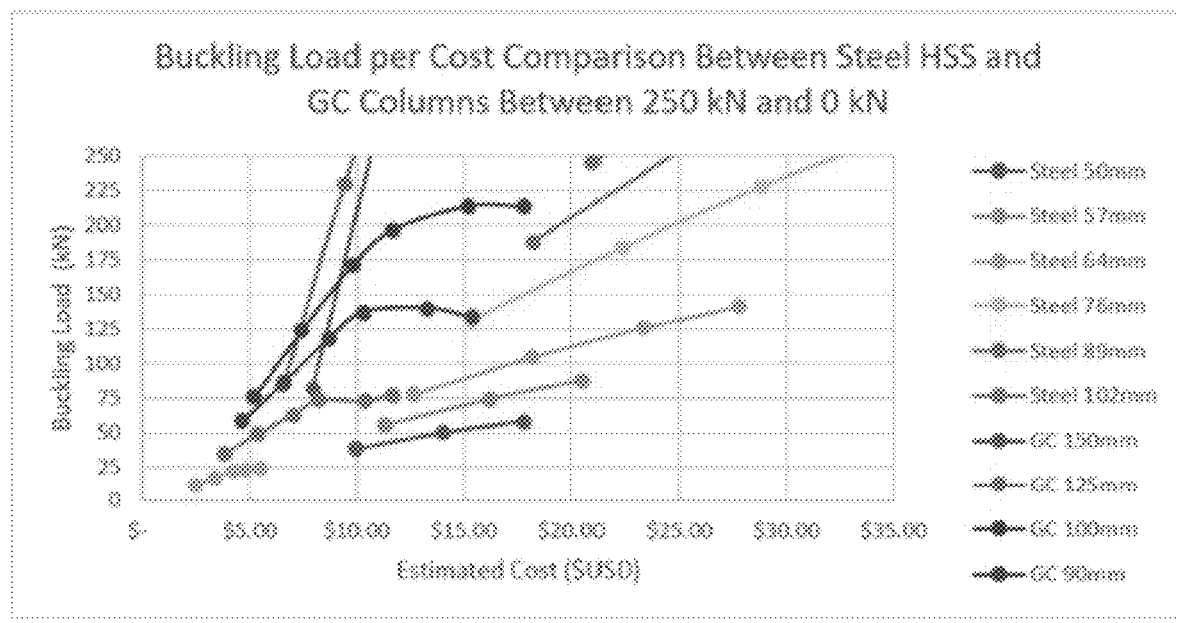
FIG. 20 shows the cost vs. buckling load comparison between the hollow-structural-steel (HSS) sections and the GRCCs of the Example 1 below. This figure covers the buckling loads for 250 to 0 kN.

Next, the buckling loads vs. costs of the different dimensions of the GRCCs are graphically presented. This is shown in FIGS. 19 and 20. Due to the ranges of the values, two graphs are presented; FIG. 19 covers the range of strengths from 1000 to 250 kN while FIG. 20 covers 250 to 0 kN.

As can be seen in the graphs of FIGS. 19 and 20, GRCCs tend to have lower costs, with cost savings up to 50% over their HSS equivalents. However, GRCCs tend to have lower buckling loads for equivalent outside dimensions, particularly for the smaller OD GRCCs. This means that if the dimensions of the column are restricted, it may require the use of a steel section.

6. Interpretation of the Results

Figure 21:
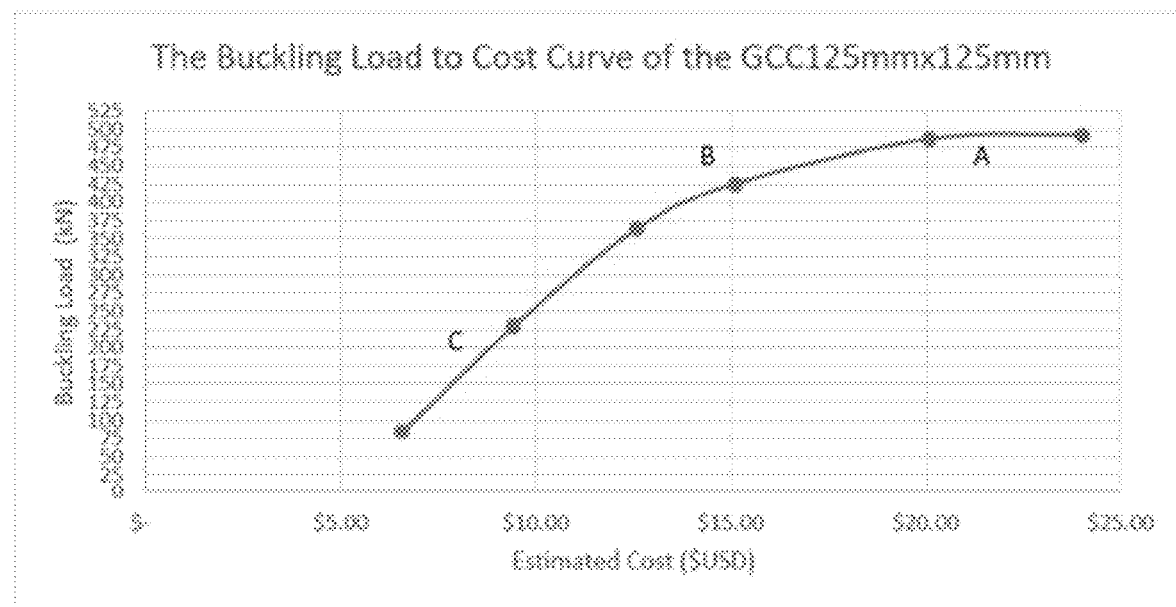
FIG. 21 shows the buckling load vs. cost graph for the GRCC 125×125×3 of the Example 1 below. The glass is varied to produce the cost curve. This figure highlights the regions A, B, and C, each having specific attributes.

Looking at the results, there are three primary regions that describe the buckling load to cost relationships between columns controlled by buckling failure. These regions can be seen in FIG. 21. FIG. 21 is the buckling load to cost curve of the GRCC 125 mm×125 mm for the different glass plate thicknesses. Specifically, FIG. 21 highlights three primary regions for the curve, denoted A, B, and C.

These regions correspond to three conditions occurring in the GRCC. Region A is the location to which increasing glass content does not significantly add to the buckling load of the column. This occurs as the moment of inertia is not significantly improved by additional glass as the additional glass is placed closer to the centroid of the column.

Figure 12:
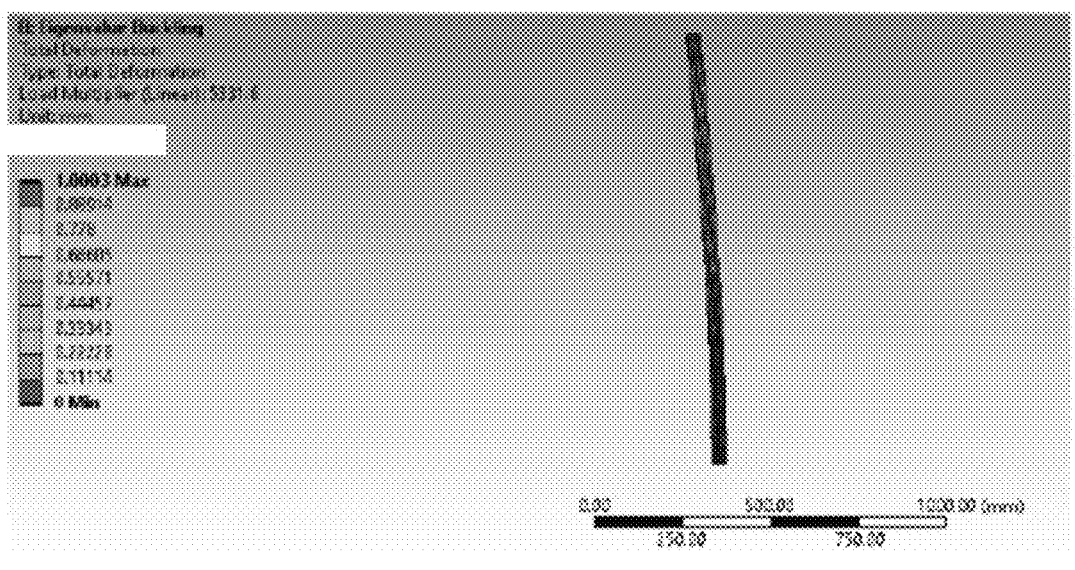
FIG. 12 shows the first mode of buckling failure was the gross-buckling of the GRCC of the Example 1 below along the weak axis.
Figure 13:
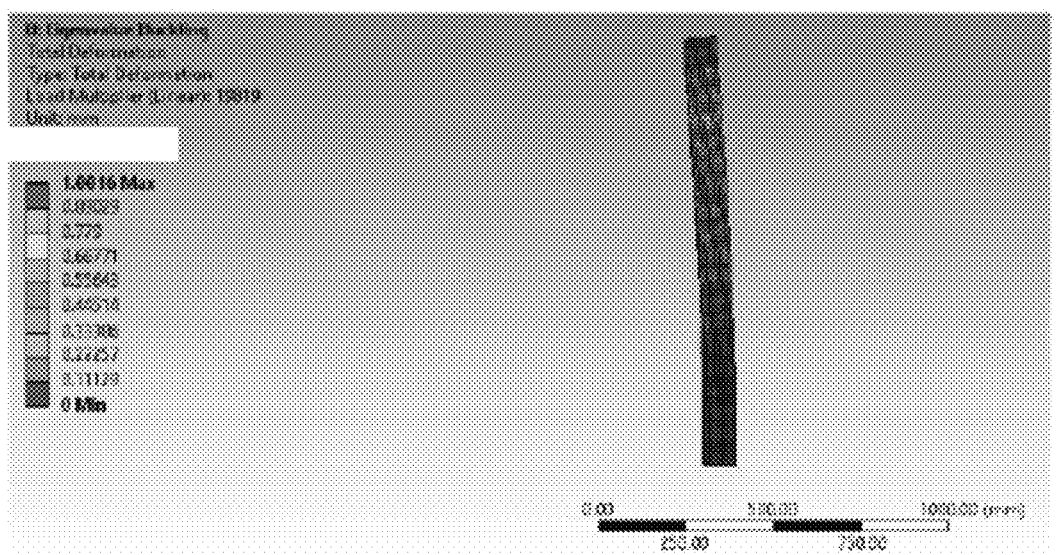
FIG. 13 shows the second mode of buckling failure of the Example 1 below was gross-buckling along the strong axis.

Region B is the region in which most economical designs occur. HSS appears to all be within this region, indicating that the original design of HSS most likely took this into account. This region is the preferred region for GRCC as well as it produces the most buckling load for the cost. The failure modes expected are gross buckling of the column, as is seen in FIGS. 12 and 13.

Region C occurs when the glass begins to locally buckle. This can be seen in FIG. 22. In this figure, the HDPE sleeve is not able to prevent the glass from greatly displacing locally at the top of the column. This results in premature failure of the column, preventing it from being able to fully engage the section. As a result, the column begins to rapidly lose buckling load for the given cost, as is reflected in FIG. 21's region C.

Figure 22:
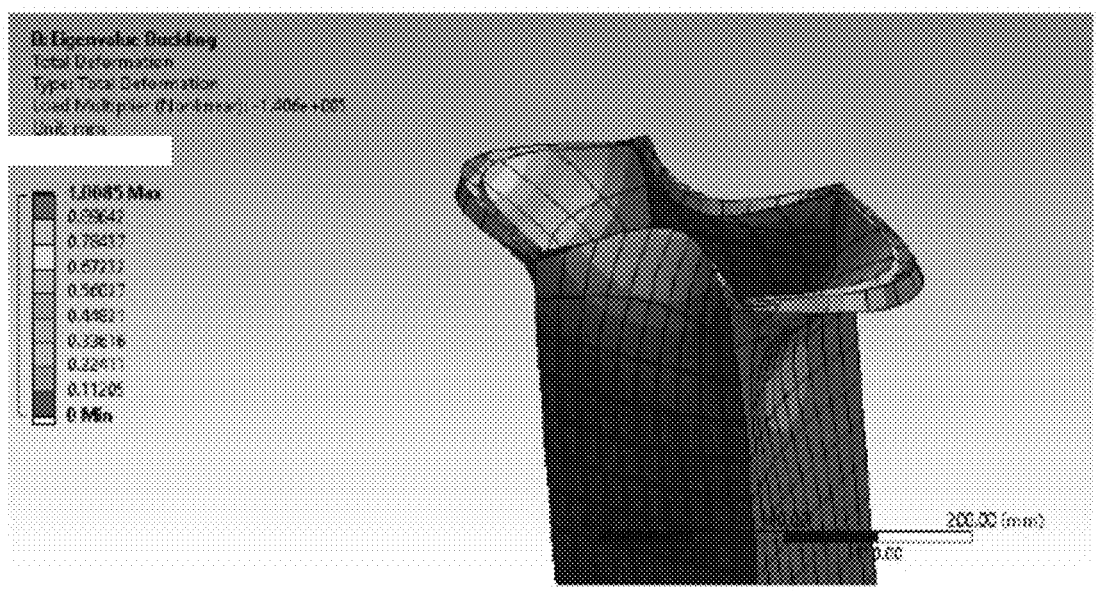
FIG. 22 shows the local buckling of GRCCs of the Example 1 below occurs when the high-density polyethylene (HDPE) sleeve cannot provide sufficient stiffness to prevent the glass from locally buckling at the point of loading.

It should be mentioned that the deflected shape in FIG. 22 appears as though it is debonding, but this occurs as the ANSYS program exaggerates the deflections of individual elements; these exaggerated deflections cause the localized overlap and stretched look at the top of the column in FIG. 22b. If desired, these excessive deflections can be depressed by utilizing large deflections within ANSYS. However, the inventors have opted to utilize the exaggerated deflections to allow viewing of the buckling failure mode.

This condition of local buckling of shapes occurs in HSS. As Reference 28 indicated, there exists a region in which steel sections are considered slender. Specifically, the local buckling based on plate buckling is a similar condition, which is described in the commentary, section E7.2. Slender Stiffened Elements of Reference 28.

7. Required Bond Strengths

Much of this Example 1 assumed that the bond strengths between the glass plates and polymer sleeves were sufficient to prevent delamination of the composites.

Figure 23:
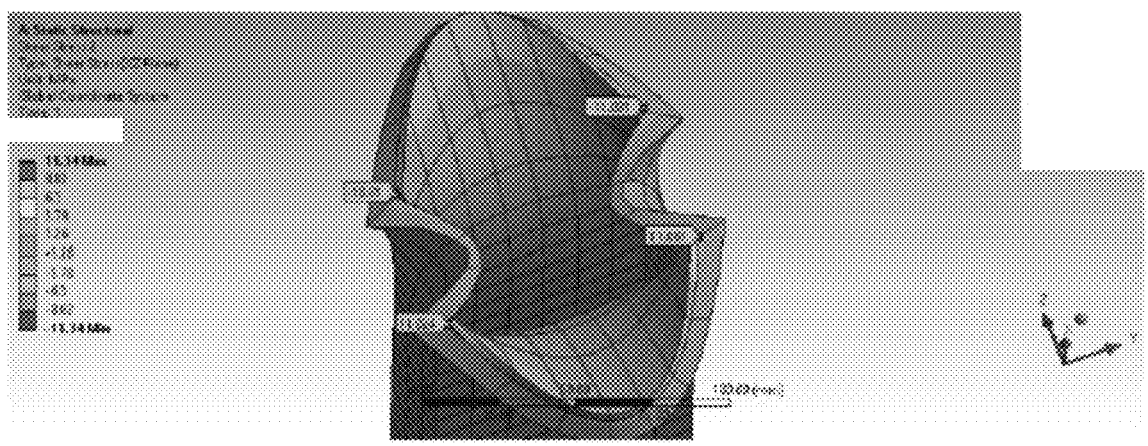
FIG. 23 shows the shear stress at the interface between the glass sheets and HDPE for the 89×38×3×1 GRCC of the Example 1 below.

To make this determination, the shear stresses at the polymer-glass interface for the 2×4 stud equivalents were determined. For these sections, the shear stresses are shown in FIGS. 23 and 24B. In FIG. 23, the maximum shear stress is shown for the 89×38×3×1 GRCC at the weak-axis buckling loading of 4.43 kN.

Figure 24:
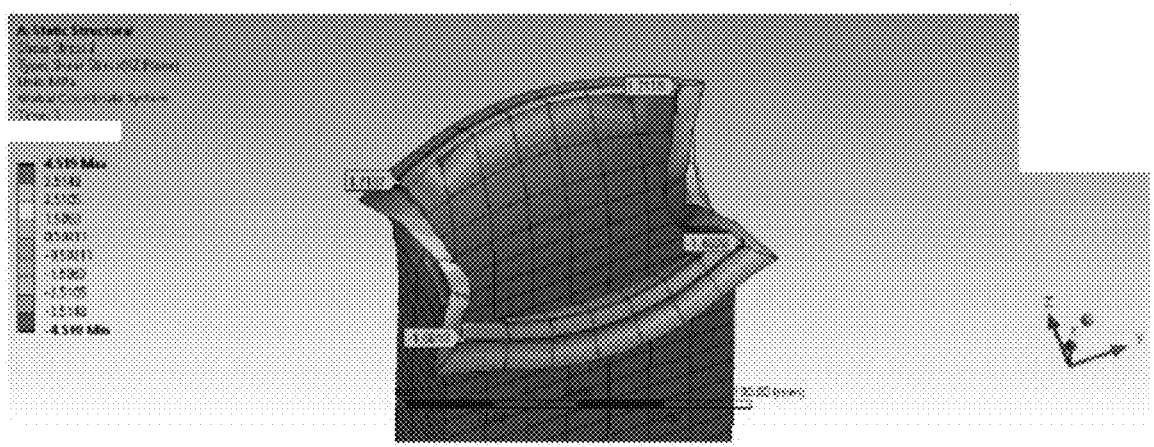
FIG. 24 shows the shear stress at the interface between the glass sheets and HDPE for the 89×38×3×4 GRCC of the Example 1 below.
Figure 25:
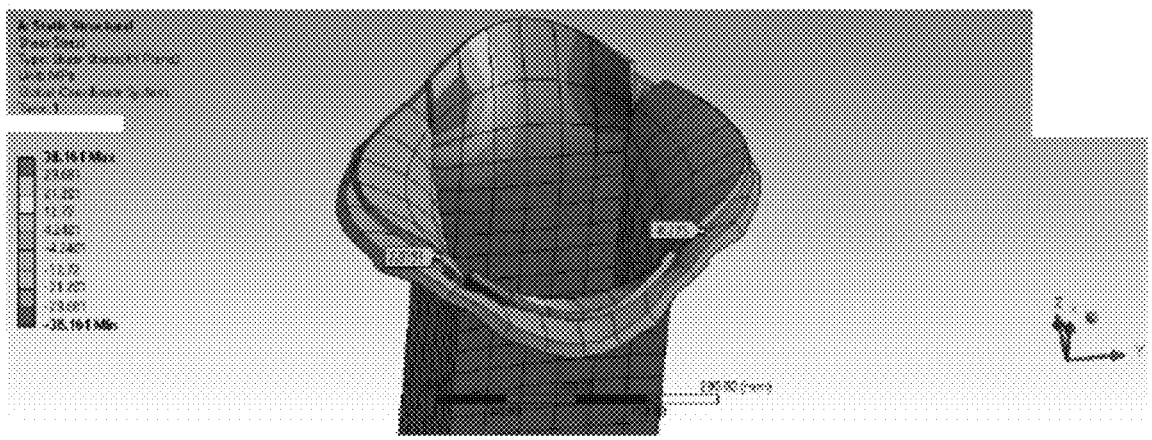
FIG. 25 shows the shear stress at the interface between the glass sheets and HDPE for the 150×150×3×3 of the Example 1 below.

In FIG. 24, the shear stresses at the interface are shown for the 89×38×3×4 GRCC. This column is also loaded to its weak-axis failure loading of 12.0 kN. Note that the stresses in FIG. 24 are at most 1.7158 MPa, which is significantly smaller than the maximum shear stress of 11.091 MPa indicated in FIG. 23. Similar to the previous two examples, a third (FIG. 25) is shown; this is the 150×150×3×3 GRCC at the buckling load. Note that these stresses are less than the worst case from FIG. 23 above.

So, the worst-case design is that of the 89×38×3×1, which if loaded in the strong axis, the shear stress would become 30.69 MPa (as the ratio between the weak and strong axis buckling loads is 2.77:1). These stresses are within the acceptable limits for typical sizing agents. For instance, Reference 29 indicated that interfacial shear stresses up to 44 MPa are possible, with 32 MPa being the lower limit of their samples.

8. Conclusions

Glass-reinforced composite columns (GRCCs) were investigated from a cost standpoint, to determine if GRCCs could be constructed at a cost that lower than competing structural materials. GRCCs, when constructed to compete against No. 3 grade Douglas fir, can provide comparable buckling loads while costing 11% less than the equivalent timber. Additionally, it was found that GRCCs can provide up to 50% cost savings over equivalent steel columns, although GRCCs tend to have lower buckling loads for their overall dimensions. This means in applications where size limitations are stringent, steel will likely be the superior choice, but this is dependent on a number of factors.

These cost estimates were based on an assumed factor of 40% for the manufacturing costs for the intended to be over jacketing extruded sections [Ref. 25]. This assumption may be inaccurate, although no cost estimation alternative has been found. Additionally, this Example 1 assumed that appropriate bond strengths could be developed between the glass plates and the polymers, a requirement for bonding the glass to the exterior sleeve of polymer. This is possible using sizing agents, chemicals utilized by the glass-fibers industry, although the costs are not reflected in the estimated costs presented. While specific sizing agent interfacial shear stresses for HDPE have not been researched, the interfacial shear stresses of similar use (for epoxies) have strengths that are within the stresses presented in this Example 1.

Example 2

Overview of Example 2

Glass reinforced composite columns (GRCCs) may provide an economical alternative to conventional construction materials due to the superior cost to strength provided by bulk glass. However, owing to glass's relatively low Young's modulus and difficulty in building bonds with conventional binders (or matrices), construction of a composite column has been less straightforward. This research of Example 2 bypasses the use of sizing agents to build the necessary bond strengths between glass and other polymers by utilizing polyurethane resin as the binder, which naturally bonds to glass. The unreinforced, control column failed at a load of 11,207 N while the maximum GRCC load was 30,804 N, a 2.79-fold increase in strength of the column. The results of this research of Example 2 indicate that glass can be loaded to 123 MPa prior to the beginning of the delamination failure of the columns, which is approximately the stress requirement as that of a steel column equivalent GRCC. Additionally, the glass-polyurethane interface continued to be loaded to a maximum shear stress of 53 MPa, far exceeding the 11 MPa required shear strength for practical GRCCs. However, buckling of the columns did occur below the theoretical maximum load. The columns failed at a maximum load of 30,804 N with the theoretical maximum buckling load being 64,420 N. However, in an unbonded condition, the critical buckling load is only 5,423 N. What this indicates is that through delamination, the column slowly was transferring to an unbonded condition, causing the buckling failure. However, these delaminations are unlikely to occur in practical GRCCs due to the lower shear stress values. Accordingly, this research of Example 2 suggests that GRCCs can be produced while maintaining appropriate safety factors against the delamination of the composite and the buckling strengths required for practical GRCCs.

1. Introduction

Construction costs have been increasing over time, typically from increased material costs [Ref. 31], including 23 consecutive months of increased costs [Ref. 32]. The majority of the cost increases over the past 70 years have been due to increased incomes and increased home prices [Ref. 33], which is good for the society but a limitation for the construction industry. To combat these increasing costs, alternate materials, especially composite materials, may provide an environmentally friendly and cost-effective solution that does not negatively impact society.

The earliest recorded composites were those composed of a clay binder (or matrix) and utilizing straw as reinforcement [Ref. 34]. In the $19^{th}$ century, steel-reinforced concrete was invented [Ref. 35] and continues to have widespread use in the world today, being one of the most common composite materials. The use of the term composite in and of itself originates from aircraft manufacturing during World War II [Ref. 36]. During this time, substantial improvements were made to composite research, particularly for military applications such as aircraft [Ref. 37]. What brought about this research of Example 2 was an attempt to incorporate the strengths of materials predicted from solid-state theory and crystalline material into practical applications [Ref. 38]. Significant amounts of research regarding composites is focused on composites with small features, such as fibers, with less extensive research on macro-scale composites [Ref 39]. This, however, should not be seen as a negative with respect to civil infrastructure composites, which tend to be macro-scale composites, as many of the determinations of research regarding these composites with smaller features apply to macro-scale composites. One example is sizing agents, chemicals utilized for glass fiber composites to allow glass to bond appropriately to polymer matrices (or binders). Some examples of macro-scale composites utilized for civil engineering applications include concrete, reinforced concrete (the most similar material to glass reinforced composite columns [GRCCs]), asphalt, and cased drilled shafts. In general, the importance of composites to civil engineering has increased over time [Ref 40].

A glass compressive strength of 1000 MPa is assumed for this Example 2. While this is not commonly known information, there are select sources that indicate a value of 1000 MPa is conservative. For instance, [Ref. 41] indicates that the compressive strength of fused quartz is greater than 1100 MPa. [Ref. 42] indicates that, when loaded with a compressive load that is dynamic, borosilicate glass can have a strength of 2000 MPa. [Ref. 43] indicates that a strength of 1000 MPa can be assumed for glass in a general case.

It should be specifically stated that bulk glass, as defined by glass manufactured as continuous sheets as opposed to glass fibers or batch processes, is being investigated in place of glass produced by these other manufacturing processes. Glass fibers, while having a substantial tensile strength, have an unfavorable strength to cost ratio due to the increased manufacturing difficulty associated with this material. Glass fibers also perform more poorly in compression than bulk glass (~700 MPa strength [Ref 44] vs. 1,000 MPa strength for bulk glass as indicated above), compiling to an even less ideal compressive strength to cost ratio when compared to bulk glass.

This is also a stark contrast with polymers reinforced with pultruded glass fibers, such as indicated by [Refs. 45-48]. This Example 2 encourages, in place of the use of glass fibers, the incorporation of bulk glass sheets as reinforcement due to their lower cost and higher strength. Pultruded glass fibers have their place in practical application but are not the focus of this example.

It would be incomplete to not include a section on the bonding strength of polyurethane to glass. A similar composite structure developed by Mohamad et al. [Ref. 49] resulted in failure due to debonding of the composite to the glass fibers. The failure mechanisms noted by Mohamad et al. were similar to the failure mechanisms noted in this example. The bonding of glass to polyurethane is due primarily to hydrogen bonding as opposed to ionic, covalent, or chemical bonding [Ref. 50]. The specific bond strength of polyurethane thermoset resin to borosilicate glass is unknown but is unlikely to exceed the finite element modeling determined stresses of 53 MPa. However, for the eventually manufactured glass reinforced composite columns utilizing high density polyethylene (or other lower cost thermoplastic resin) will utilize sizing agents that can provide a typical strength of 44 MPa [Refs. 51,52].

The works of Example 2 presented here have additional supporting literature. The incorporation of glass as a load bearing material has been attempted by many others (e.g. [Refs. 53-56]). These applications tend to seek a transparent material for aesthetic reasons. These type structures, when designed to allow for maximum loading, require post tensioning of the glass to build compression in the glass, which are not practical for the column type applications we envision.

What is particularly interesting about properly designed composites is that the method of manufacture, design requirements, and configuration all work together to provide an appropriate material that can be applied to industry [Ref. 57]. That is to say, the eventual configuration of GRCCs, after they have been vetted, will likely change to incorporate additional advantages that can be found by manufacturing the reinforcement to fit the requirements of a compressive reinforcement. For example, the eventual manufactured glass may have a roughened surface, ribs on the surface, or other bond-strength increasing configuration to better allow the shear stress to transfer across the bulk glass and polymer binder (or matrix) interface. The complexity of composite designs are dictated by the manufacturing techniques available to the composite manufacturing industry [Ref. 37].

This Example 2 seeks to demonstrate that a cost-competitive material composed of a polymer binder and bulk glass reinforcement can be produced and maintain appropriate safety factors. To confirm this, samples are manufactured using a thermoset polymer casting process. The eventual manufacturing process proposed for GRCCs is an overjacketing extrusion process (also referred to as coextrusion, such as by [Ref. 58]), which is similar to a pultrusion process. In an overjacketing extrusion process, the bulk glass would be fed into the extrusion head of an extruder; as the glass feeds into the head of the extruder, polymer is extruded over the outside surface of the glass. The polymer exterior sheeting serves two purposes: it provides a protective coating on the glass and greatly improves the critical buckling load of the columns. So while the samples manufactured for this Example 2 are manufactured using a casting process, the eventual process will be an overjacketing extrusion process as this manufacturing method leads to significantly improved manufacturing costs per unit [Ref. 59].

There are additional benefits to bulk glass. Bulk glass, when compared on a basis of $CO_2$ generated and embodied energy per unit strength, bulk glass produces only 15% the $CO_2$ of concrete manufacturing (assuming recycled glass) and 20% the embodied energy of concrete [Ref. 57]. Additionally, the materials utilized for GRCCs are resistant to degradation that normally occurs with civil infrastructure materials.

This Example 2 aims specifically at testing to determine the possibility of practical GRCCs being utilized with appropriate safety factors. The practical GRCCs were first researched in our earlier publication [Ref 52], in which we concluded that a 2×4 stud replacement could be manufactured at an 11% savings over structural timber and a GRCC replacement for steel columns could be manufactured at a 50% savings. Accordingly, we produced samples utilizing thermoset polyurethane resin and a PVC inner core, which is explained in the procedure section. Following this, we discuss the results which come in the form of load vs. displacement graphs for the columns. After this, we analyze these results using both analytical equations and finite element modeling. A discussion and conclusion section finish Example 2, discussing that there is strong evidence that the bond strengths necessary for practical GRCCs are far below the bond strengths that developed during our testing.

2. Procedure

Figure 26:
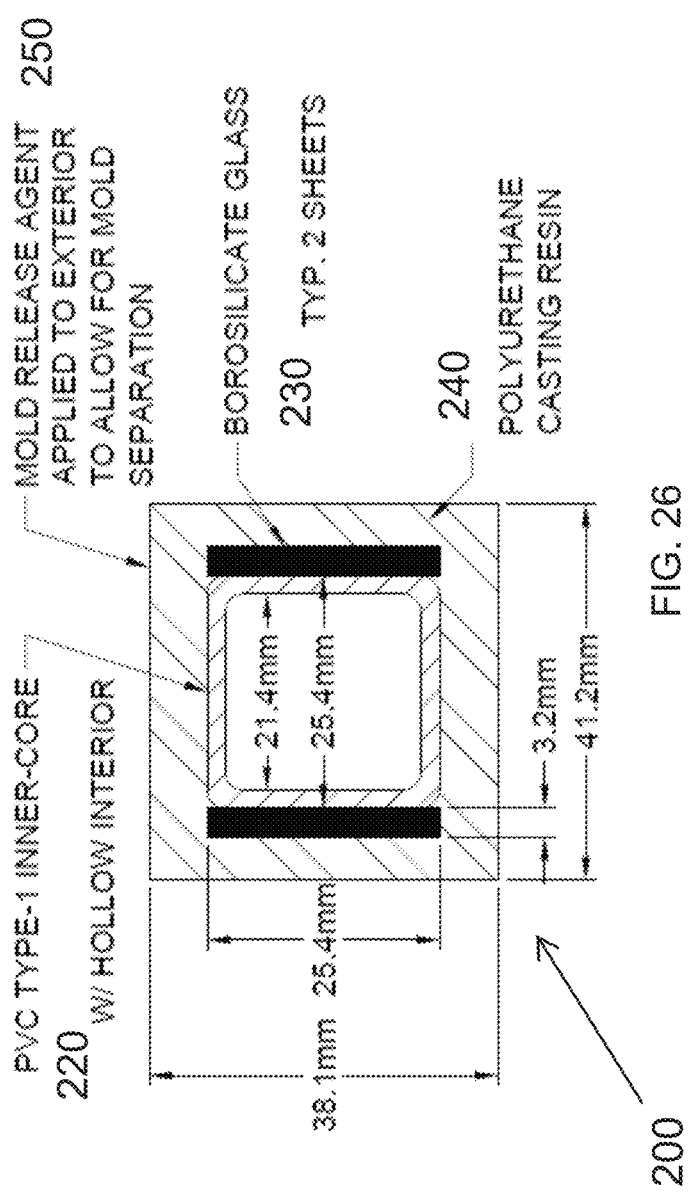
FIG. 26 shows another embodiment of a GRCC selected for manufacture in Example 2 below with dimensions shown.
Figure 27:
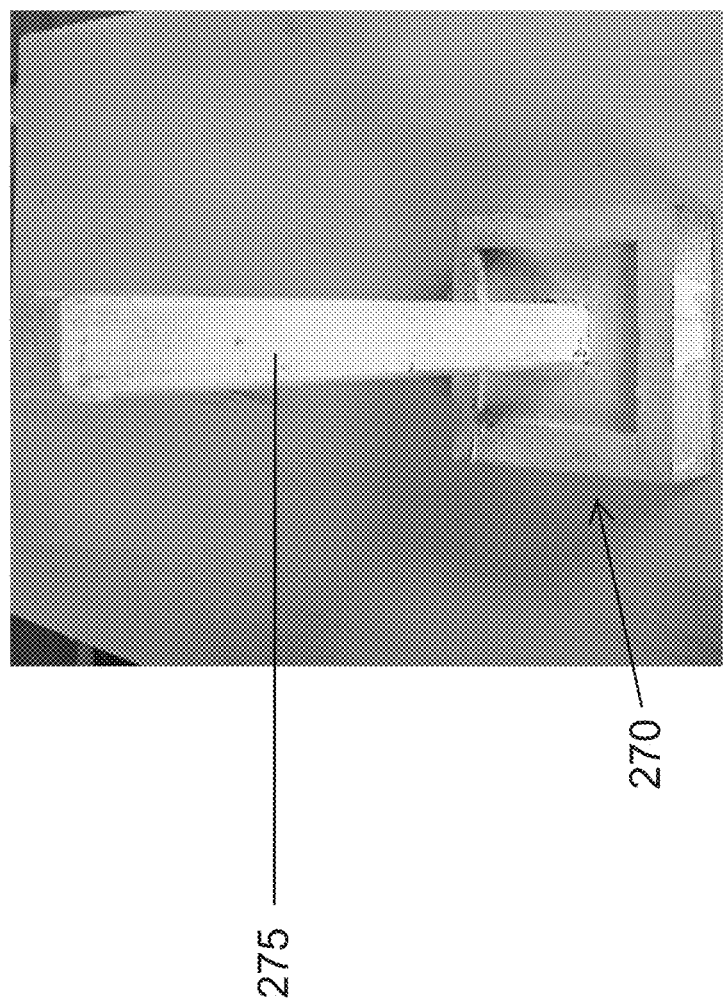
FIG. 27 shows the base of the mold, which features a square dowel to allow for supporting the PVC inner-core during fabrication of the GRCC of FIG. 26 in Example 2 below.

The procedure of Example 2 began with the fabrication of the columns. This was accomplished through a custom mold created using wood fabrication techniques. As shown in FIG. 26, the column 200 selected for fabrication is a GRCC utilizing Resi-Cast™ 731 polyurethane casting resin 240 as the binder, a Type-1 PVC inner-core 220 (supplied by McMaster-Carr) with two panes of borosilicate glass 230 (also supplied by McMaster-Carr). A mold release agent 250 was used. The columns finished height was 304.8 mm. The other column dimensions can be seen in FIG. 26. FIG. 27 shows the custom mold base 270, which includes a square dowel 275 to allow for alignment of the inner-core PVC sleeve 220.

Figure 28B:
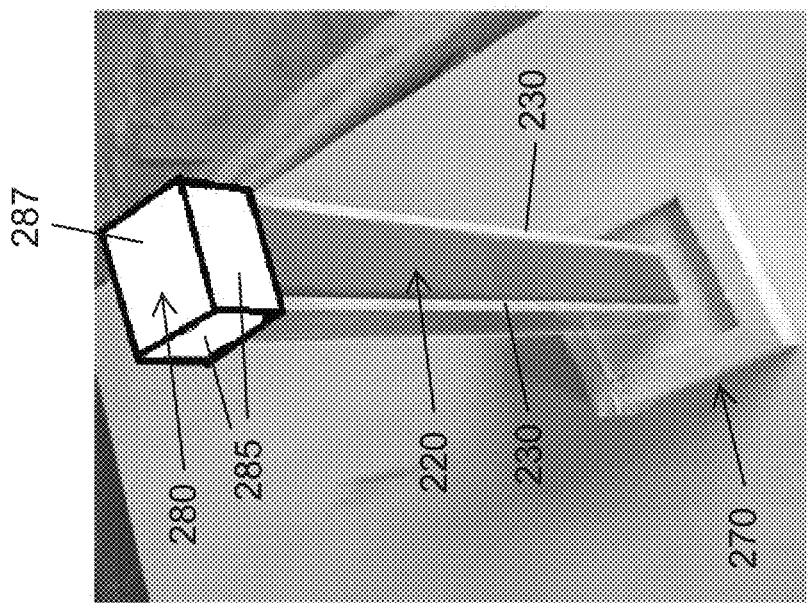
FIG. 28B shows another embodiment of a GRCC with an end cap on the glass and inner-core.
Figure 28A:
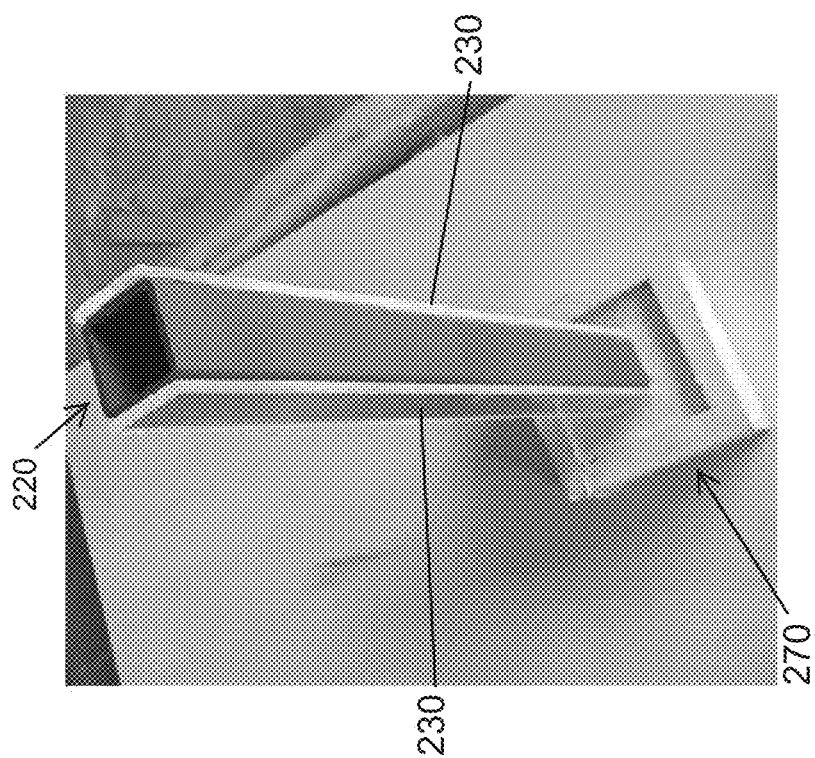
FIG. 28A shows the glass and inner-core have been installed onto the base during fabrication of the GRCC of FIG. 26 in Example 2 below.

FIG. 28A illustrates the PVC inner-core 220 installed onto the square dowel 275. Double-sided tape was utilized to temporarily stick the two panes of borosilicate glass 230 to the inner-core 220 to allow for these panes to be held in place during the manufacturing of the samples. Note that the glass was excluded for the control column, instead leaving the inner-core installed with no additional glass pieces.

FIG. 28B shows another embodiment of a GRCC with the PVC inner-core 220 and the two panes of borosilicate glass 230 having an end cap 280 comprising four vertical walls 285 and a horizontal end surface 287. The end cap 280 can comprise a polymeric material such as polyethylene, polyvinyl chloride, polypropylene, polyamide, nylon, polycarbonate, polyethylene terephthalate, polyurethane resin, and epoxy resin. Capping of the columns with the end cap 280 allows for "end nailing" in framing, a process wherein screws or nails are driven through a horizontal top board into the end cap 280 of the GRCC. The end cap 280 can be installed on both ends in many applications. The end cap can greatly help with fixing the GRCC in place since the material that is embedded by the screw can be greatly increased. This allows for a drop-in-place replacement as intended.

FIGS. 28C and 28D show yet another embodiment of a glass reinforced composite column (GRCC) 200A with an end cap 280A. The column 200A includes a polyurethane casting resin 240A as the binder (similar to polyurethane casting resin 240 as shown in FIG. 26), an inner-core (not shown—similar to inner core 220 shown in FIG. 26), and two panes of borosilicate glass (not shown—similar to panes 230 shown in FIG. 26). The end cap 280A includes a first section 281A and a second section 282A having a recessed area 283A (compared to the first section 281A) at its perimeter. The first section 281A has an end surface 287A. A seam between the polyurethane casting resin 240A and the recessed area 283A of the end cap 280A is bonded throughout through melting and pressing into place or other adhesives. The end cap 280A can comprise a polymeric material such as polyethylene, polyvinyl chloride, polypropylene, polyamide, nylon, polycarbonate, polyethylene terephthalate, polyurethane resin, and epoxy resin. Capping of the column 200A with the end cap 280A allows for "end nailing" in framing, a process wherein screws or nails are driven through a horizontal top board into the end cap 280A of the column 200A. Example fastener locations 289A are shown in FIG. 28D.

FIG. 28E shows still another embodiment of a glass reinforced composite column (GRCC) 200B with an end cap 280B. The end cap 280B is an alternate design with reduced material usage compared to end cap 280A. The column 200B includes a polyurethane casting resin 240B as the binder (similar to polyurethane casting resin 240 as shown in FIG. 26), an inner-core (not shown—similar to inner core 220 shown in FIG. 26), and two panes of borosilicate glass (not shown—similar to panes 230 shown in FIG. 26). The end cap 280B includes a first section 281B and four side walls 285B extending away from the first section 281B at locations inward from the perimeter of the first section 281B. The side walls 285B define a hollow region 286B of the end cap 280B. The first section 281B of the end cap 280B has an end surface 287B. A seam between the polyurethane casting resin 240B and the side walls 285B of the end cap 280B is bonded throughout through melting and pressing into place or other adhesives. The end cap 280B can comprise a polymeric material such as polyethylene, polyvinyl chloride, polypropylene, polyamide, nylon, polycarbonate, polyethylene terephthalate, polyurethane resin, and epoxy resin. Capping of the column 200B with the end cap 280B allows for "end nailing" in framing, a process wherein screws or nails are driven through a horizontal top board into the end cap 280B of the column 200B. Example fastener locations 289B are shown in FIG. 28E.

Figure 29:
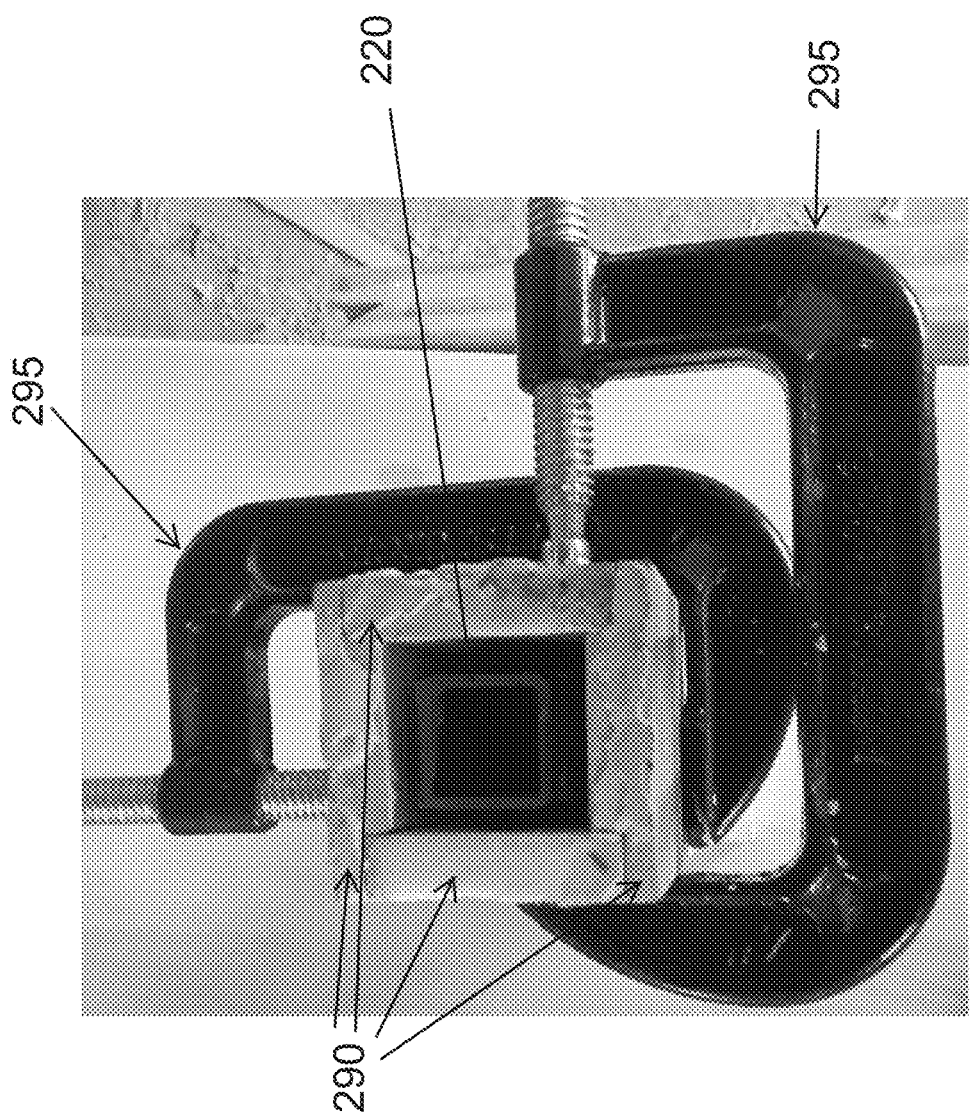
FIG. 29 shows the final mold has been assembled, including clamping into place during fabrication of the GRCC of FIG. 26 in Example 2 below.

FIG. 29 shows the final assembly, in which the wood planks 290 have been installed around the inner-core and have been clamped into position by clamps 295. The region between the wooden planks 290 and the outside of the PVC inner-core 220 will be filled with polyurethane casting resin 240 to the top of the mold.

A mold release agent 250 was applied to the wood planks 290, allowing for the polyurethane composite to be separated from the mold. This created a slick surface on the final composite but is not believed to have contributed to the premature failure of the columns as this surface was not contacted during loading. There is, however, the possibility that the mold release agent was accidentally applied (through finger contact with the glass) to the polyurethane-glass interface, which may have contributed to delaminations of the glass from the polyurethane in certain samples. We believe that GRCC-4, which had a substantially lower strength than the other columns, had a defect associated with mold release agent being inadvertently applied to the surface of the glass.

3. Results

Table 5 collates the findings of the testing into a single table with data on the ultimate failure load, the delamination load, and additional notes.

TABLE 5

The loading of the 4 columns at first delamination and at the ultimate failure loading.

| Sample | Designation | Delamination Load (N)** | Ultimate Failure Load (N) | Note | Ultimate Failure Load Increase over Control |
|---|---|---|---|---|---|
| GRCC-C | Control* | N/A | 11027 | | N/A |
| GRCC-1 | 2 | 25617 | 28704 | | 260% |
| GRCC-2 | 3 | 29963 | 29963 | Max Load at First Delamination | 272% |
| GRCC-3 | 4 | 23509 | 30804 | | 279% |

*The control column contained no glass reinforcement, therefore it failed at significantly less load.
**The delamination load is defined as the first major delamination of the column, defined as a drop in loading at the point of delamination which is greater than 3000N.

Figure 30:
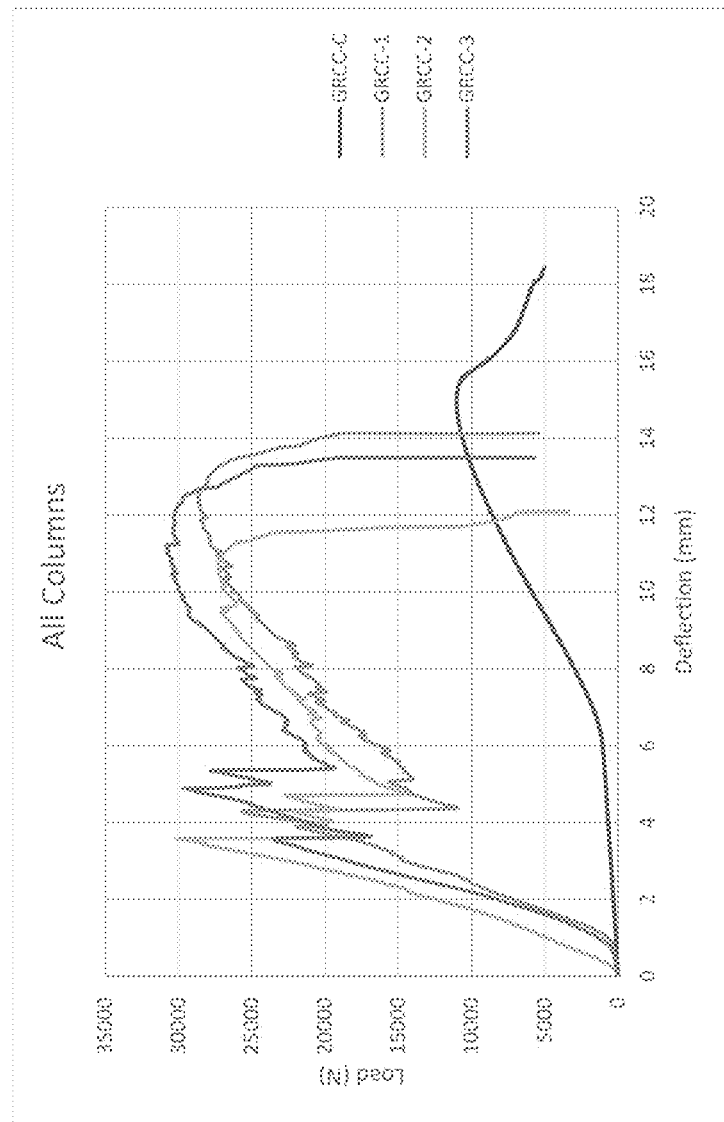
FIG. 30 shows all of the load curves for the GRCCs in Example 2 below placed on a single graph, including the control column (the lowest values). Note the similarity in load to deflection for columns GRCC-1 through GRCC-3, indicating a similar stiffness for these columns. These more ideal columns performed quite well in comparison to the control and GRCC-4 (the rejected column).

For reference, all load vs. deflection curves of each column are included in FIGS. 33 through 37. Presented in FIG. 30 is the load vs. deflection of the columns referenced in Table 5. As can be seen in the graphs of the loading vs. deflection, there are sudden drops in loading of the column. These sudden drops correspond to cracking sounds within the columns. These cracking sounds are believed to be the sound of the delamination of the glass from the polyurethane. While not desirable, these sounds give warning of the impending failure of the column, a safety feature similar to the indications of failure that manifest in conventional civil structural materials (such as concrete cracking prior to failure).

4. Analysis

In order to provide context, analysis is necessary for interpreting the results of the data. First, the elastic moduli of the polyurethane and PVC interior column must be determined. This was accomplished by first calculating the transformed geometric moment of inertia of interior of the control column using averaged or known values of the elastic moduli of each material (polyurethane [Ref 60], PVC average value [Ref. 61]). This resulted in the following analysis, which follows the procedure conducted as part of [Ref 62], which utilizes the method of transformed sections:

$$E_{polyurethane} = 1.827 GPa \tag{1}$$

$$E_{PVC} = 2.8 GPa \tag{2}$$

$$\eta = \frac{E_{PVC}}{E_{polyurethane}} = 1.53 \tag{3}$$

$$I_{polyurethane} = \frac{1}{12}[(1.625in)(1.5in)^3 - (1in)^4] = 0.374in^4 \tag{4}$$

$$I_{PVC} = \frac{1}{12}[(1in)^4 - (0.844in)^4] = 0.041in^4 \tag{5}$$

$$I^* = I_{polyurethane} + \eta I_{PVC} = 0.437in^4 = 181,800 mm^4 \tag{6}$$

$$F_{cr} = \frac{\pi^2 EI^*}{(KL)^2} = \frac{\pi^2(1.827e9N/m^2)(1.82e-7m^4)}{(1*0.305m)^2} = 35,243N \tag{7}$$

Now, since the control column failed at 11027 N, the elastic moduli of both the polymers were derated to a lower value accordingly:

$$E^*_{polyurethane} = \left(\frac{11027N}{35243N}\right)1.827 GPa = 0.572 GPa \tag{8}$$

$$E^*_{PVC} = \left(\frac{11027N}{35243N}\right)2.86 GPa = 0.876 GPa \tag{9}$$

Repeating the analysis again results in the following critical buckling load:

$$F_{cr} = \frac{\pi^2 EI^*}{(KL)^2} = \frac{\pi^2(0.572e9N/m^2)(1.82e-7m^4)}{(1*0.305m)^2} = 11,034 N \tag{10}$$

Due to rounding error, there is a slight difference in critical buckling load after the analysis, but it is within a reasonable value (0.06% error).

Next, the other columns were analyzed using these new elastic moduli that had been determined for the polymers. These assume an elastic modulus for borosilicate glass of 62 GPa (average [Ref. 62]). Accordingly, the analysis for the reinforced columns proceeds as follows:

$$E_{polyurethane} = 0.572 GPa \tag{11}$$

$$E_{PVC} = 0.876 GPa \tag{12}$$

$$E_{glass} = 62 GPa \tag{13}$$

$$\eta_{PVC-polyurethane} = \frac{E_{PVC}}{E_{polyurethane}} = 1.53 \tag{14}$$

$$\eta_{glass-polyurethane} = \frac{E_{glass}}{E_{polyurethane}} = 108 \tag{15}$$

$$I_{polyurethane} = \tag{16}$$
$$\frac{1}{12}[(1.625in)(1.5in)^3 - (1in)^4 - (0.125in)(2)(1in)^3] = 0.363 in^4$$

$$I_{PVC} = \frac{1}{12}[(1in)^4 - (0.844in)^4] = 0.041 in^4 \tag{17}$$

$$I_{glass} = \frac{1}{12}(0.125in)(2)(1in)^3 = 0.021 in^4 \tag{18}$$

$$I^* = I_{polyurethane} + \eta_{PVC-polyurethane}I_{PVC} + \eta_{glass-polyurethane}I_{glass} = \tag{19}$$
$$2.69 in^4 = 1,119,700 mm^4$$

$$F_{cr} = \frac{\pi^2 EI^*}{(KL)^2} = \frac{\pi^2(0.572e9N/m^2)(1.12e-6m^4)}{(1*0.305m)^2} = 68,732 N \tag{20}$$

The glass and polymer stresses should also be calculated to verify that failure did not occur due to one of the materials failing in compression instead of the buckling failure. Accordingly, the stresses of the control column and the best performing column (GRCC-3) are shown below, at the point of failure. For an explanation of the analysis process, see [Ref 63] pg. 146:

Control Column $$A_{polyurethane} = (1.625 in)(1.5 in) - 1 in^2 = 1.4375 in^2 \tag{21}$$

$$A^*_{PVC} = \eta_{PVC-polyurethane}(4)(0.078 in)(1 in) = 0.477 in^2 \tag{22}$$

$$A^* = A^*_{PVC} + A_{polyurethane} = 1.915 in^2 = 1,235 mm^2 \tag{23}$$

For this area, the resulting strain is:

$$\epsilon = \frac{\delta}{L} = \frac{P}{E_{polyurethane}A^*} = \frac{(11,027 N)}{(0.572e9 Pa)(1.23e-3m^2)} = 0.0156 \tag{24}$$

For which the loads can be calculated from the Young's moduli of each material:

$$\sigma_{polyurethane} = E_{polyurethane}\epsilon = (0.572\ GPa)0.0156 = 8.92\ MPa \tag{25}$$

$$\sigma_{PVC} = E_{PVC}\epsilon = (0.876\ GPa)0.0156 = 13.66\ MPa \tag{26}$$

This is below the polyurethane typical strength of 34.4 MPa and below the typical PVC strength of 22.9 MPa.

The process is repeated for GRCC-3:

$$A_{polyurethane} = (1.625in)(1.5in) - 1in^2 - (0.125in)(2)(1in) = 1.1875 in^2 \tag{27}$$

$$A^*_{PVC} = \eta_{PVC-polyurethane}(4)(0.078in)(1in) = 0.744 in^2 \tag{28}$$

$$A^*_{glass} = \eta_{glass-polyurethane}(0.125in)(2)(1in) = 27.0 in^2 \tag{29}$$

$$A^* = A^*_{glass} + A^*_{PVC} + A_{polyurethane} = 28.66 in^2 = 18,500 mm^2 \tag{30}$$

For this area, the resulting strain is:

$$\epsilon = \frac{\delta}{L} = \frac{P}{E_{polyurethane}A^*} = \frac{(30,804 N)}{(0.572e9 Pa)(18.5e-3m^2)} = 0.00288 \tag{31}$$

For which the loads can be calculated from the Young's moduli of each material:

$$\sigma_{polyurethane} = E_{polyurethane}\epsilon = (0.572\ GPa)0.00288 = 1.65\ MPa \tag{32}$$

$$\sigma_{PVC} = E_{PVC}\epsilon = (0.876\ GPa)0.00288 = 2.52\ MPa \tag{33}$$

$$\sigma_{glass} = E_{glass}\epsilon = (62\ GPa)0.00288 = 178\ MPa \tag{34}$$

As before, the polymers are not stressed to their maximum load. The analytical equations indicate that the glass has been stressed to 178 MPa, which is 18% of its theoretical maximum strength. This analysis, however, is found to be insufficient in describing the values of the stresses in the GRCCs as is detailed in the following finite element analysis (FEA).

4.1 Finite Element Analysis

To provide superior metrics of the analysis, it is appropriate to conduct FEA of the results, in an attempt to replicate the results. Therefore, a finite element model (FEM) was developed that attempts to replicate the findings of the analysis.

Ansys 2020 R1 software was utilized to complete the FEM. In this, we selected a static structural analysis with an additional Euler Bernoulli analysis to determine the critical buckling loads of the columns.

The analysis was conducted assuming a fully bonded condition. The Young's Moduli indicated above were utilized alongside assumed values of 0.20 [Ref 64], 0.40 [Ref. 65], and 0.49 [Ref. 66] for the Poisson's ratios of borosilicate glass, PVC, and polyurethane. The glass composite column, which was modeled using the previously listed dimensions (see FIG. 26), was subjected to a load of 29,963 N, the maximum delamination load determined from experimental testing. To simulate a pin-pin equivalent buckling mode, we reduced the column length in half and modeled using a fixed base condition.

Figure 31:
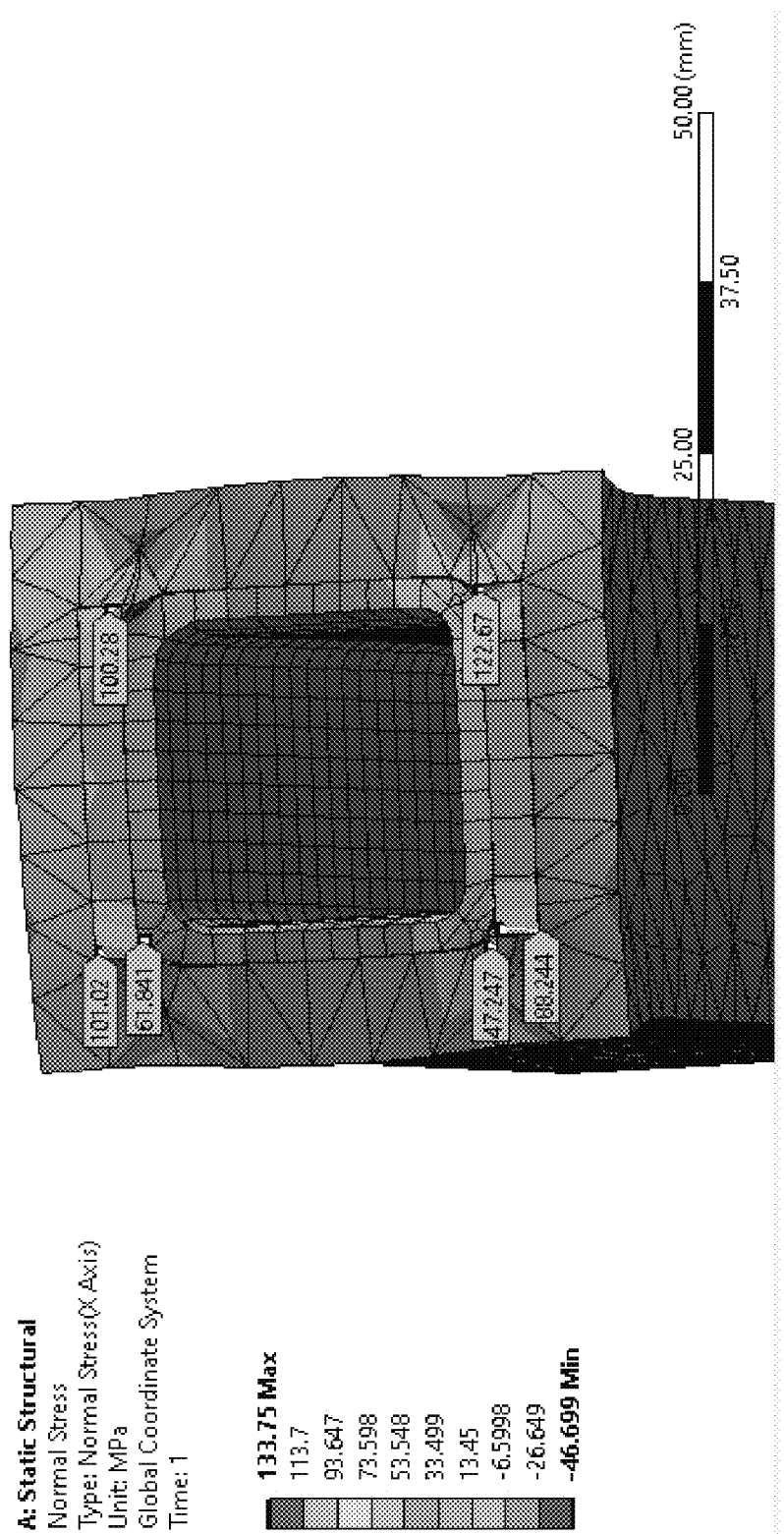
FIG. 31 shows the normal stresses of the finite element modeled GRCC-2 in Example 2 below at the delamination load.
Figure 32:
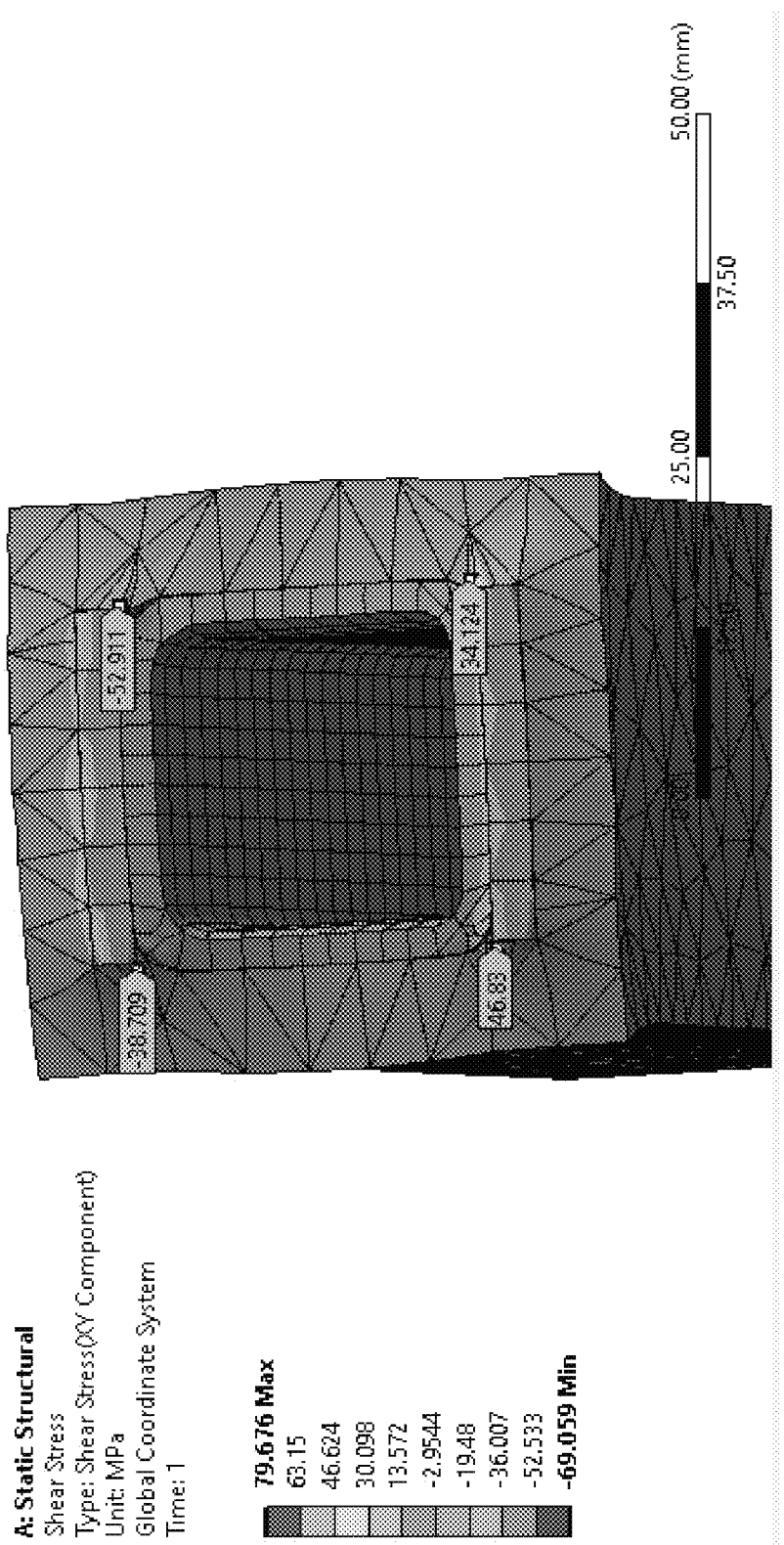
FIG. 32 shows the shear stresses of the finite element modeled GRCC-2 in Example 2 below at the delamination load. Note that this is likely approaching the delamination shear stresses at the glass-polyurethane interface.
Figure 33:
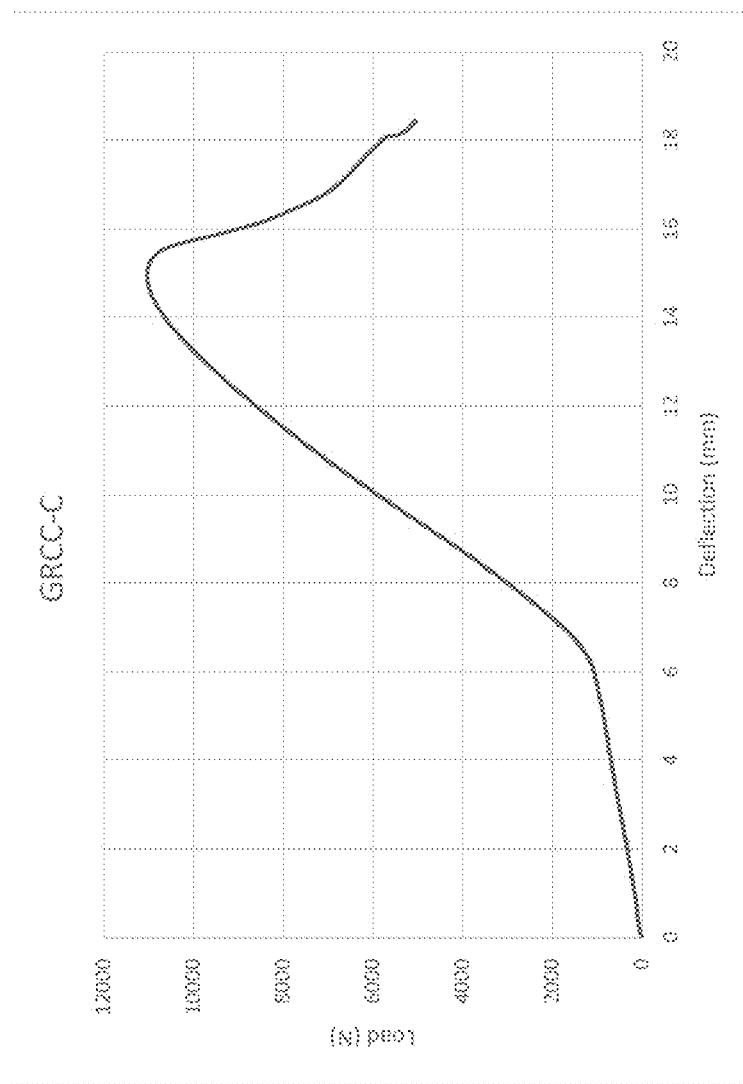
FIG. 33 shows the control column in Example 2 below, in which no glass reinforcement was present.
Figure 34:
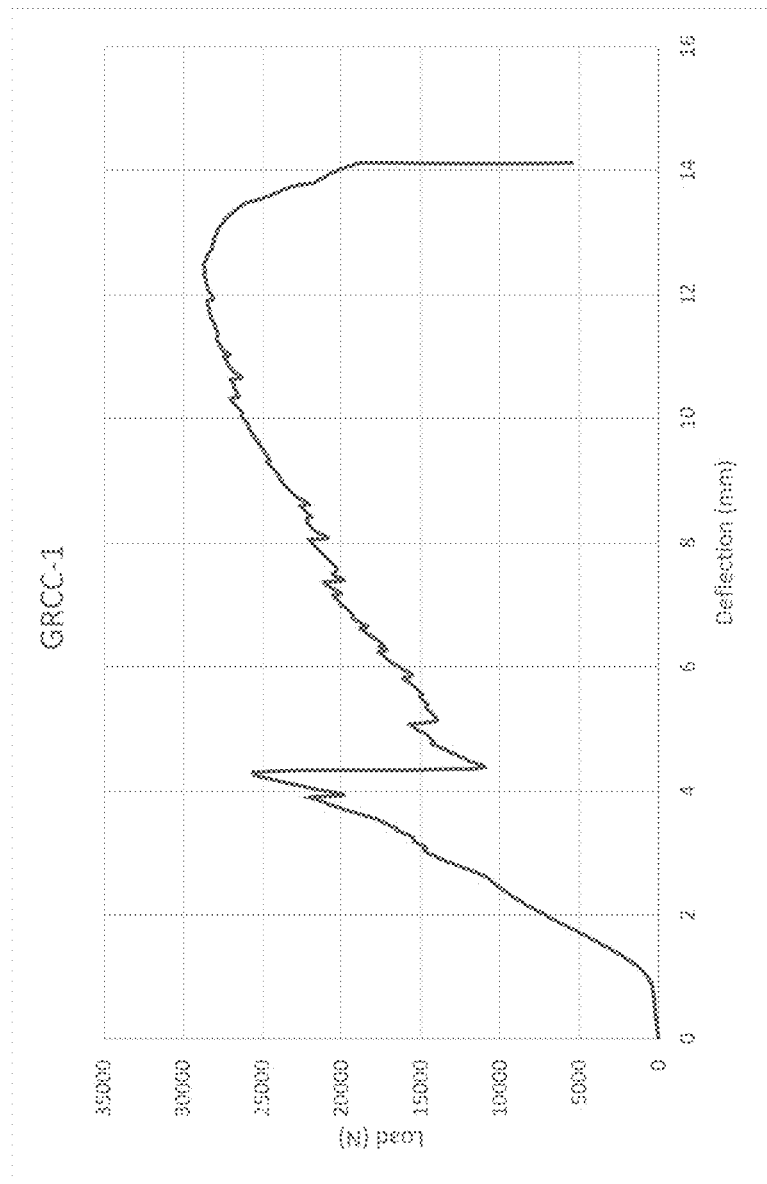
FIG. 34 shows the load curve of GRCC-1 in Example 2 below. This column performed moderately well and likely had slight manufacturing defects.
Figure 35:
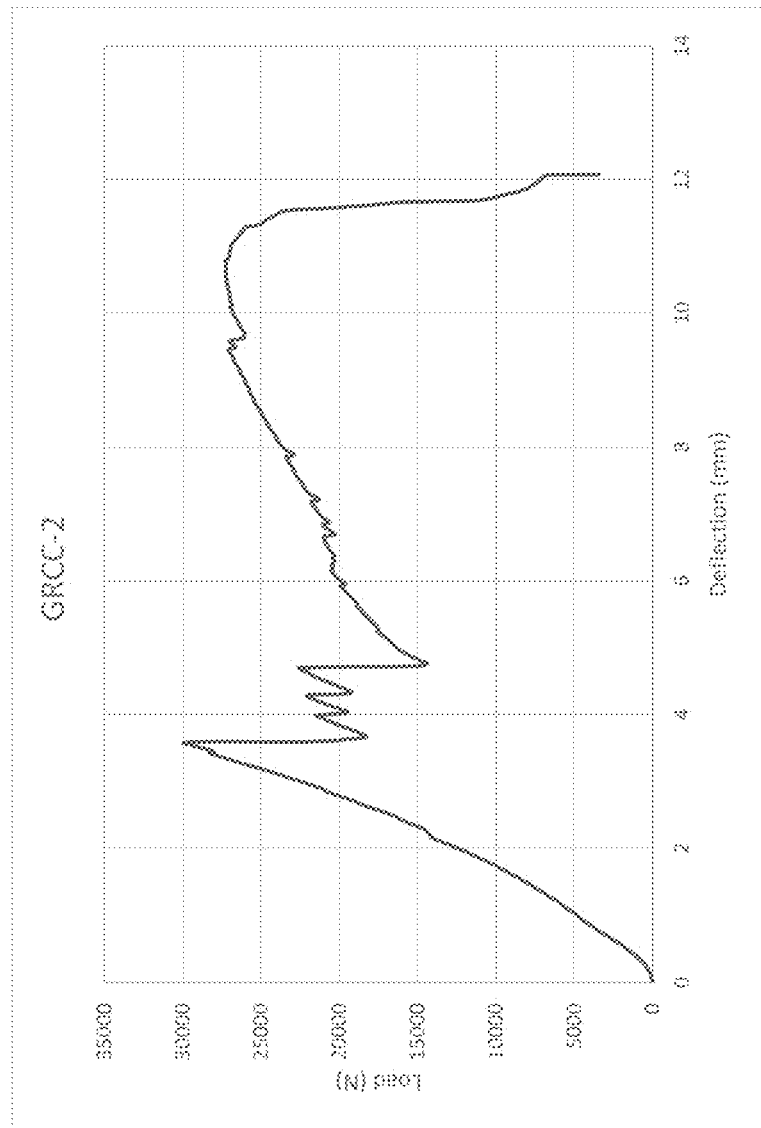
FIG. 35 shows the load curve of GRCC-2 in Example 2 below. This column had a substantial delamination load, outperforming the other columns in this regard though the ultimate load was less than the first delamination load.
Figure 36:
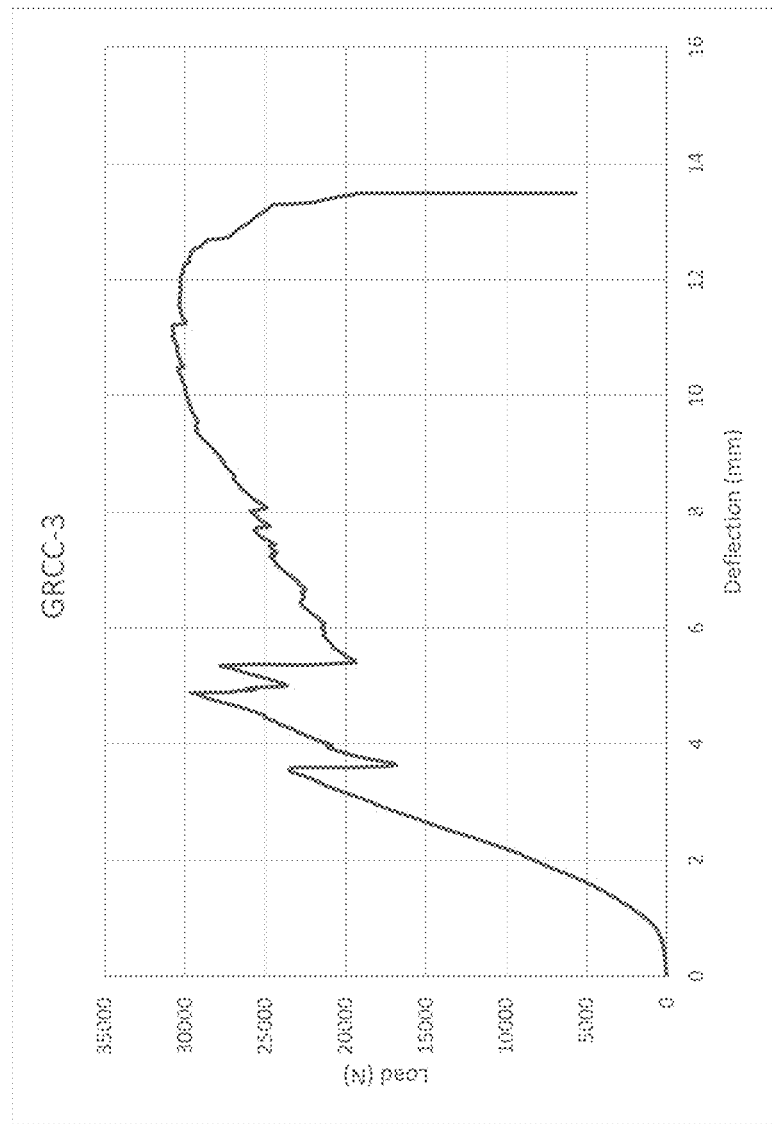
FIG. 36 shows the load curve for the GRCC-3 column in Example 2 below. This column had the greatest ultimate load and there are multiple peaks where delamination occurred at the early onset.
Figure 37:
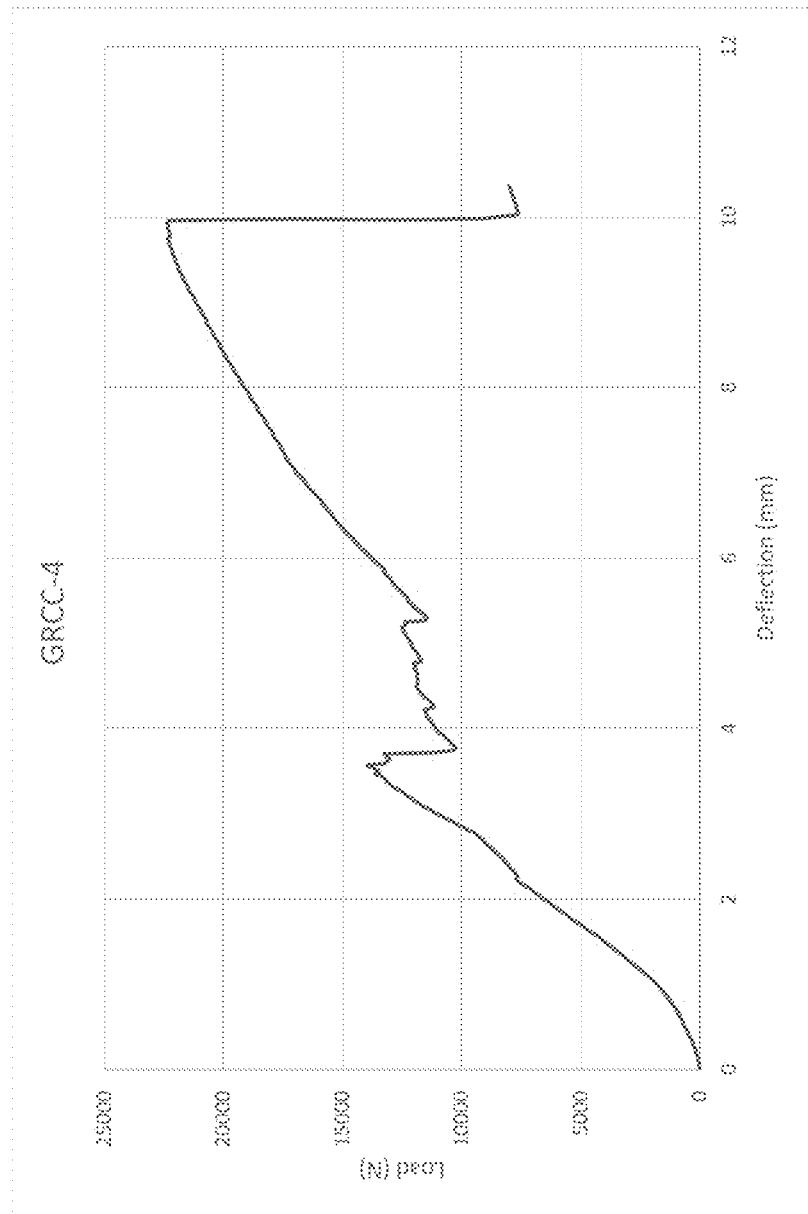
FIG. 37 shows the load curve for the GRCC-4 column in Example 2 below. Delamination began at a low value and the ultimate load was low for this column, likely due to manufacturing defects.

This results are shown in FIGS. 31 and 32. In FIGS. 31 and 32, the glass stress is a lower value than previously calculated using analytical modeling (123 MPa) and the shear stress maximum value at the delamination load of GRCC-2 (the loading condition being 29,963 N) is 53 MPa. Note that this shear stress value likely exceeds the bond strength value for glass and polyurethane.

Running the Ansys FEM (with the aforementioned condition of a fixed base and half-length for an equivalent KL factor and a loading of 29,963 N) for Euler Bernoulli buckling results in a failure factor of 2.15, or, in other words:

$$F_{cr}\text{(FEM,bonded condition)} = 2.15 * 29963 \text{N} = 64{,}420 \text{N} \tag{35}$$

Now, the analysis is repeated with frictional factors included for the bonding, having assumed that the bonding failures have occurred. This results in significantly lower stresses and a significantly lower critical buckling load:

$$F_{cr}\text{(FEM,frictional condition)} = 0.181 * 29963 \text{N} = 5{,}423 \text{N} \tag{36}$$

What we can conclude from this analysis is that the most likely condition in the actual column occurs due to a region between these two critical buckling loads. In other words, the column becomes more and more delaminated as it approaches the smaller buckling load above (FEM, frictional condition).

5. Discussion

As was determined in our previous publications, the maximum glass stress in a practical, glass reinforced composite column is 115 MPa for a steel column equivalent and 73.9 MPa for a 2×4 stud equivalent column [Ref. 52]. Specifically, what we indicate by a steel column equivalent is a column which has matched dimensions of a hollow structural steel (HSS) column while maintaining similar capacities using a GRCC. What we indicate by a 2×4 stud equivalent column is a GRCC that has exterior dimensions of 38 mm by 89 mm and having similar capacities as a wooden 2×4 stud. This means that for these practical columns, considering the stresses that were allowed to develop within the glass, that the glass composite would provide nearly identical loadings between the practical GRCCs and those columns tested as part of this Example 2 (123 MPa for this study, 115 and 73.9 MPa for the practical GRCCs). There was no indication of the premature failure of the glass during loading.

The most likely cause of the failure was the delamination of the materials. The column failed before the buckling strength (failed at 30,804 N maximum when the theoretical buckling strength was 64,420 N). This means the column failed at 49% of the theoretical buckling load, which is a limitation, but due to the delaminations that were occurring, this is not a surprising find since the unbonded column would fail at a load of only 5,423 N.

Shear stresses were found to be, using FEM, 53 MPa at the delamination load of GRCC-3. In our previous research, we determined that for both steel column equivalent and 2×4 stud equivalent GRCCs that the maximum delamination shear stresses calculated using FEM were found to be 11 MPa. These previous analyses utilized analysis heights of pin-pin column conditions with heights of 10 feet for the steel equivalent and 8 feet for the stud equivalents, which were replicated in analysis using a half-height with fixed base conditions. What can be said is that in a practical GRCC in an actual loading condition encountered in a civil infrastructure application, the maximum delamination stress was found to be only 11 MPa. What we suggest is that if a GRCC were constructed utilizing polyurethane casting resin and borosilicate glass is that the delamination stress of 53 MPa would never be fully reached in these applications, having a safety factor of 4.82 (derived from 53 MPa divided by 11 MPa) against delamination. In practical GRCCs, the failure mode is unlikely, as a result of this safety factor, to be associated with delamination but rather with gross buckling of the column.

Even when considering the lowest delamination load of 23,509 N (excluding the rejected GRCC-4 column), a safety factor of 3.78 can be suggested for the practical designed GRCCs.

The GRCC-4 column was excluded from the analysis. This was done as this column had an obvious manufacturing defect, failing at significantly less load than GRCC-1 through 3 (though it still had a strength 202% greater than the control column). The most likely reason for premature failure was the inadvertent application of mold release agent to the borosilicate glass through finger contact. This would cause this column to quickly approach the frictional column buckling strength, effectively lowering the total strength of the column. Care should be given to cleaning gloves between processing steps to prevent such occurrences.

6. Conclusion

Glass reinforced composite columns (GRCCs) may provide a superiorly cost-effective alternative to conventional structural materials owing to the significant cost to strength advantages glass provides [Ref. 57]. This Example 2 indicates that the likelihood that a GRCC would fail due to unforeseen weaknesses in glass are unwarranted conclusions to be drawn regarding the technology. This research of Example 2 clearly indicates that glass can be loaded to the requirements required for practical GRCCs. Additionally, the shear stresses that invoke delamination are unlikely to occur in practical GRCCs, with a safety factor of 4.82 provided against delamination.

REFERENCES

1. Cotter, J.; Guldiken, R., Theoretical Design Strategies, Strengths, Costs, and Environmental Impacts of Triple Composite Beams Utilizing Glass Compressive Reinforcement. *J. Compos. Sci.* 2020, 4, 22.
2. Bos, F.; Louter, P., Challenging Glass: Conference on Architectural and Structural Applications of Glass; Faculty of Architecture, Delft University of Technology: Delft, The Netherlands, 2008.
3. Northolt, M., Compressive strength and glass transition temperature. *J. Mater. Sci.* 1981, 16, 2025-2028.
4. Zhan, Y.; Wu, G., Global buckling capacity of pultruded FRP-I section columns under axial compression. *Mech. Res. Commun.* 2018, 90, 8-17.
5. Wong, P., Wang, Y., An experimental study of pultruded glass fibre reinforced plastics channel columns at elevated temperatures. *Compos. Struct.* 2007, 81, 84-95.
6. Correia, M.; Nunes, F.; Correia, J.; Silvestre, N., Buckling behavior and failure of hybrid fiber-reinforced polymer pultruded short columns. *J. Compos. Constr.* 2013, 17, 463-475.

7. Nunes, F.; Correia, J. R.; Silvestre, N., Structural behaviour of hybrid FRP pultruded columns. Part 1: Experimental study. *Compos. Struct.* 2016, 139, 291-303.
8. Nunes, F.; Silvestre, N.; Correia, J. R., Structural behaviour of hybrid FRP pultruded columns. Part 2: Numerical study. *Compos. Struct.* 2016, 139, 304-319.
9. Ivashchenko, E., Sizing and finishing agents for basalt and glass fibers. *Theor. Found. Chem. Eng.* 2009, 43, 511-516.
10. Tang, L. G.; Kardos, J. L., A review of methods for improving the interfacial adhesion between carbon fiber and polymer matrix. *Polym. Compos.* 1997, 18, 100-113.
11. Michelman, Michem®Emulsion 93135M. Available online: https://www.michelman.com/Michem-Emulsion/Michem(r)-Emulsion-93135M/.
12. Cardoso, D. C.; Harries, K. A.; Batista, E. D. M. Compressive strength equation for GFRP square tube columns. *Compos. Part B Eng.* 2014, 59, 1-11.
13. Kalpakjian, S., Manufacturing Processes for Engineering Materials, 6th ed.; Pearson Education Inc.: Hoboken, NJ, USA, 2017.
14. Vanevenhoven, L. M., Shield, C. K., Bank, L. C., LRFD factors for pultruded wide-flange columns. *J. Struct. Eng.* 2010, 136, 554-564.
15. Hunt, D. P., Combination Metal and Composite Stud. U.S. Pat. No. 5,713,176, 3 Feb. 1998.
16. Forest2Market. North American Lumber Market: Adjusting to Uncertainty. Forest2Market Blog. 2020. Available online: https://www.forest2market.com/blog/north-american-lumber-market-adjusting-touncertainty
17. Forest2Market. North American Softwood Lumber Prices Steady Despite Market Uncertainty. Forest2Market Blog. 2019. Available online: https://www.forest2market.com/blog/north-american-softwood-lumber-pricessteady-despite-market-uncertainty.
18. Ochshorn, J., Capacity of Wood Column Calculator. Cornell.edu. 2014. Available online: https://courses.cit.cornell.edu/arch264/calculators/example7.1/index.html
19. Council, A. W., National Design Specification (NDS) for Wood Construction, 2012nd ed.; American Wood Council Leesburg: Leesburg, VA, USA, 2012.
20. Council, A. W., National Design Specification (NDS) for Wood Construction, 2005th ed.; American Wood Council Leesburg: Leesburg, VA, USA, 2005.
21. Abrisa Technologies. Specialty Glass Products Technical Reference Document Soda-Lime Float Glass. Available online: https://abrisatechnologies.com/specs/Soda-Lime%20Float%20Glass%20Spec%20Sheet%2012_10.pdf.
22. ToolBox, E. Young's Modulus—Tensile and Yield Strength for common Materials. 2003. Available online: https://www.engineeringtoolbox.com/young-modulus-d_417.html
23. Alibaba.com. Available online: https://www.alibaba.com/products/soda_lime_glass_sheet.html?IndexArea=product_en&sort_type=TRALV
24. Alibaba.com. Available online: https://www.alibaba.com/trade/search?fsb=y&IndexArea=product_en&CatId=&SearchText=hig h+density+polyethylene (accessed on 21 Nov. 2019).
25. Griff, A., The Real Economics of Extrusion. Plastics Today. 2018. Available online: https://www.plasticstoday.com/extrusion-pipe-profile/real-economics-extrusion/190306234159293
26. MetalMiner. Carbon Steel MetalMiner Prices. 2020. Available online: https://agmetalminer.com/metalprices/carbon-steel/
27. EngineersEdge. Coefficient of Friction Equation and Table Chart. 2020. Available online: www.engineersedge.com
28. AISC. Steel Construction Manual, 13th ed.; American Institute of Steel Construction: Chicago, IL, USA, 2005; pp. 16.1-268-16.1-272.
29. Hiasa, T.; Kobayashi, D.; Ichikawa, T.; Endo, M., Sizing Agent-coated Reinforcing Fibers, Method for Producing Sizing Agent-coated Reinforcing Fibers, Prepreg, and Fiber-reinforced Composite Material. U.S. Pat. No. 10,208,173, 19 Feb. 2019.
30. Hibbeler, R. C., Mechanics of Materials, 8th ed.; Pearson Prentice Hall: Upper Saddle River, NJ, USA, 2008; pp. 693-704.
31. BuildingConstructionandDesign, "Construction material prices increase steadily in June," Access Date: Jan. 20, 2020, vol. Access URL: "https://www.bdcnetwork.com/construction-material-prices-increase-steadily-june", 2018.
32. K. Slowey, "Construction costs increased for 23rd consecutive month," *Construction Dive*, vol. Access Date: Jan. 20, 2020, 2018.
33. S. V. Voorhis, "Studies Probe the Causes of Rising Road Construction Pricetags," ENR New York, vol. Access Date: Jan. 22, 2020, 2019.
34. E. Quagliarini, and S. Lenci, "The influence of natural stabilizers and natural fibres on the mechanical properties of ancient Roman adobe bricks," *Journal of Cultural Heritage*, vol. 11, no. 3, pp. 309-314, 2010.
35. S. Kalpakjian, and S. R. Schmid, Manufacturing processes for engineering materials, 6th ed., p. 664: Pearson Education India, 2017.
36. A. Kelly, "Composite materials after seventy years," *Journal Of Materials Science*, vol. 41, no. 3, pp. 905-912, 2006.
37. S. Mazumdar, Composites manufacturing: materials, product, and process engineering: CrC press, 2001.
38. E. P. Scala, "A brief history of composites in the US—the dream and the success," *JOM Journal of the Minerals, Metals and Materials Society*, vol. 48, no. 2, pp. 45-48, 1996.
39. R. F. Gibson, Principles of composite material mechanics: CRC press, 2016.
40. S. Bush, M. Ashby, N. Swindells, R. Bullough, G. Ellison, Y. Lindblom, R. Cahn, and J. Barnes, "Technology of the 1990s: Advanced Materials and Predictive Design: Discussion," *Philosophical Transactions of the Royal Society of London Series A*, vol. 322, pp. 404-407, 1987.
41. M. Northolt, "Compressive strength and glass transition temperature," *Journal of Materials Science*, vol. 16, no. 7, pp. 2025-2028, 1981.
42. J. T. Chojnacki, and W. W. Chen, "Mechanical Response of Borosilicate and Soda-Lime Glass Under Dynamic Triaxial Compression," *Journal of Dynamic Behavior of Materials*, vol. 2, no. 2, pp. 251-258, 2016.
43. F. Bos, and P. Louter, "Challenging Glass: Conference on Architectural and Structural Applications of Glass," Faculty of Architecture, Delft University of Technology, 2008.
44. E. Bruun, "GFRP bars in structural design: determining the compressive strength versus unbraced length interaction curve," *Journal of Student Science and Technology*, vol. 7, no. 1, 2014.

45. P. Wong, and Y. Wang, "An experimental study of pultruded glass fibre reinforced plastics channel columns at elevated temperatures," *Composite Structures*, vol. 81, no. 1, pp. 84-95, 2007.
46. M. Correia, F. Nunes, J. Correia, and N. Silvestre, "Buckling behavior and failure of hybrid fiber-reinforced polymer pultruded short columns," *Journal of Composites for Construction*, vol. 17, no. 4, pp. 463-475, 2013.
47. F. Nunes, J. R. Correia, and N. Silvestre, "Structural behaviour of hybrid FRP pultruded columns. Part 1: Experimental study," *Composite Structures*, vol. 139, pp. 291-303, 2016.
48. F. Nunes, N. Silvestre, and J. R. Correia, "Structural behaviour of hybrid FRP pultruded columns. Part 2: Numerical study," *Composite Structures*, vol. 139, pp. 304-319, 2016.
49. M. Mohamed, S. Anandan, Z. Huo, V. Birman, J. Volz, and K. Chandrashekhara, "Manufacturing and characterization of polyurethane based sandwich composite structures," *Composite Structures*, vol. 123, pp. 169-179, 2015.
50. J.-P. L. Dwan'isa, A. Mohanty, M. Misra, L. Drzal, and M. Kazemizadeh, "Biobased polyurethane and its composite with glass fiber," *Journal Of Materials Science*, vol. 39, no. 6, pp. 2081-2087, 2004.
51. T. Hiasa, D. Kobayashi, T. Ichikawa, and M. Endo, "Sizing agent-coated reinforcing fibers, method for producing sizing agent-coated reinforcing fibers, prepreg, and fiber-reinforced composite material," Google Patents, 2019.
52. J. Cotter, and R. Guldiken, "Cost-Effective Bulk Glass Reinforced Composite Columns," *Journal of Composites Science*, vol. 4, no. 2, pp. 47, 2020.
53. P. Louter, "Adhesively bonded reinforced glass beams," HERON—ENGLISH EDITION—, vol. 52, no. 1/2, pp. 31, 2007.
54. C. Louter, J. Cupać, and J.-P. Lebet, "Exploratory experimental investigations on post-tensioned structural glass beams," *Journal of Facade Design and Engineering*, vol. 2, no. 1-2, pp. 3-18, 2014.
55. C. Bedon, and C. Louter, "Finite-element numerical simulation of the bending performance of post-tensioned structural glass beams with adhesively bonded cfrp tendons," 2016.
56. M. Santarsiero, C. Louter, and A. Nussbaumer, "Laminated connections for structural glass applications under shear loading at different temperatures and strain rates," *Construction and Building Materials*, vol. 128, pp. 214-237, 2016.
57. J. Cotter, and R. Guldiken, "Theoretical Design Strategies, Strengths, Costs, and Environmental Impacts of Triple Composite Beams Utilizing Glass Compressive Reinforcement," *Journal of Composites Science*, vol. 4, no. 1, pp. 22, 2020.
58. S. Kalpakjian, Manufacturing processes for engineering materials, 6th ed.: Pearson Education India, 2017.
59. D. C. Cardoso, K. A. Harries, and E. d. M. Batista, "Compressive strength equation for GFRP square tube columns," *Composites Part B: Engineering*, vol. 59, pp. 1-11, 2014.
60. MatWeb. "Renishaw 5175 Polyurethane Resin," Oct. 4, 2020; http://www.matweb.com/search/datasheet.aspx?matguid=df41b17694fd48648d91745b333c8728 &ckck=1.
61. MatWeb. "Overview of materials for PVC, Extruded," Oct. 4, 2020; http://www.matweb.com/search/datasheet.aspx?matguid=bb6e739c553d4a34b199f0185e92f6f7 &ckck=1.
62. MatWeb. "Borosilicate Glass," Oct. 8, 2020; http://matweb.com/search/DataSheet.aspx?MatGUID=b0dbbac859444ffe98307f24ffd4c6a2&ckc k=1.
63. R. C. Hibbeler, "Mechanics of materials," Upper Saddle River, NJ: Pearson/Prentice Hall, 2008.
64. VIDRASA. "DURAN/Physical and Chemical Prop. Borosilicate 3.3 Glass," Oct. 7, 2020; http://www.vidrasa.com/eng/products/duran/duran_pf.html.
65. Vinidex. "PVC Properties," Oct. 7, 2020; https://www.vinidex.com.au/technical-resources/material-properties/pvc-properties/.
66. covestro. "Mechanical properties," Oct. 8, 2020; https://solutions.covestro.com/en/highlights/articles/theme/product-technology/mechanical-properties-tpu.

The citation of any document is not to be construed as an admission that it is prior art with respect to the present invention.

Thus, the invention provides a structural column that is a cost competitive material when compared against both structural timbers and structural steel. Advantages of the invention include: (1) lower cost than conventional materials; (2) lower environmental impact by utilization of recycled materials; (3) no damage due to environmental attacks (e.g. termites, carpenter bees, fungus, etc.); (4) more readily recycled in that the components (high-density polyethylene) and glass are easily separated by gravity separation and can be reprocessed; (5) ease of use compared to lumber in that warping in lumber elements is a significant concern among contractors as excessively warped studs require additional labor to force into position and the GRCC materials described herein have less warping; and (6) ease of use in that lumber shrinks and swells dependent on moisture content, and the GRCC materials described herein have no known tendency to swell due to moisture exposure.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. Various features and advantages of the invention are set forth in the following claims.

What is claimed is:
1. A structural column comprising:
an inner sleeve comprising a first non-glass material, the inner sleeve comprising at least one wall, the inner sleeve having an outer surface and an inner surface defining a hollow interior space of the structural column;

at least one sheet comprising bulk glass, an inner surface of each sheet being adjacent to at least a portion of the outer surface of the inner sleeve; and an outer sleeve comprising a second non-glass material, the outer sleeve comprising at least one wall, an inner surface of the outer sleeve being attached to at least a portion of an outer surface of each sheet, the inner surface of the outer sleeve being attached to at least a portion of the outer surface of the inner sleeve.

2. The structural column of claim 1 wherein:
the inner sleeve comprises a first wall spaced apart from an opposite second wall, and a third wall spaced apart from an opposite fourth wall, the first wall, the second wall, the third wall, and the fourth wall of the inner sleeve being arranged such that the inner sleeve has a rectangular shape in cross-section,
the outer sleeve comprises a first wall spaced apart from an opposite second wall, and a third wall spaced apart from an opposite fourth wall, the first wall, the second wall, the third wall, and the fourth wall of the outer sleeve being arranged such that the outer sleeve has a rectangular shape in cross-section,
a first sheet comprising the bulk glass is adjacent to the first wall of the inner sleeve and the first wall of the outer sleeve, and
a second sheet comprising the bulk glass is adjacent to the second wall of the inner sleeve and the second wall of the outer sleeve.

3. The structural column of claim 2 wherein:
the third wall of the inner sleeve is attached to the third wall of the outer sleeve, and
the fourth wall of the inner sleeve is attached to the fourth wall of the outer sleeve.

4. The structural column of claim 2 wherein:
the outer sleeve has a first thickness,
the first sheet and the second sheet have a second thickness, and
a ratio of the first thickness to the second thickness is in a range of 1:0.3 to 1:10.

5. The structural column of claim 4 wherein:
the bulk glass comprises soda lime glass, and
the first non-glass material and the second non-glass material are high-density polyethylene.

6. The structural column of claim 4 wherein:
the bulk glass comprises borosilicate glass, and
the first non-glass material is polyvinyl chloride, and
the second non-glass material is polyurethane.

7. The structural column of claim 1 wherein:
the bulk glass comprises a glass selected from the group consisting of soda lime glass, borosilicate glass, fused-silica glass, aluminosilicate glass, alkali-free glass, and mixtures thereof.

8. The structural column of claim 1 wherein:
the bulk glass comprises soda lime glass or borosilicate glass.

9. The structural column of claim 1 wherein:
the first non-glass material is selected from the group consisting of high-density polyethylene, low-density polyethylene, polyvinyl chloride, polypropylene, polyamide, nylon, polycarbonate, polyethylene terephthalate, polyurethane resin, epoxy resin, Portland cement, and mixtures thereof, and
the second non-glass material is selected from the group consisting of high-density polyethylene, low-density polyethylene, polyvinyl chloride, polypropylene, polyamide, nylon, polycarbonate, polyethylene terephthalate, polyurethane resin, epoxy resin, Portland cement, and mixtures thereof.

10. The structural column of claim 9 wherein:
the first non-glass material and the second non-glass material comprise the same material.

11. The structural column of claim 10 wherein:
the first non-glass material and the second non-glass material are high-density polyethylene, and
the bulk glass comprises soda lime glass.

12. The structural column of claim 9 wherein:
the bulk glass has a first Young's modulus,
the second non-glass material has a second Young's modulus, and
a ratio of the first Young's modulus to the second Young's modulus is in a range of 50:1 to 130:1.

13. The structural column of claim 1 wherein:
a weight ratio of bulk glass to a total of the first non-glass material and the second non-glass material is from about 0.058:1 to about 6.75:1.

14. The structural column of claim 1 further comprising a sizing agent or hot melt adhesive attaching each sheet to the outer surface of the inner sleeve.

15. The structural column of claim 14 wherein:
the sizing agent is selected from the group consisting of polyolefins, polyvinyl acetate, epoxy resins, polyesters, phenolic resins, phenoxy resins, polyurethanes, acrylic resins, methacrylic resins, polyvinyl alcohol, vinyl ester-based resins, and mixtures thereof.

16. The structural column of claim 14 wherein:
the sizing agent is selected from the group consisting of polyethylene emulsions, polypropylene emulsions, polyethylene dispersions, and polypropylene dispersions.

17. The structural column of claim 14 wherein:
the hot melt adhesive is selected from the group consisting of ethylene vinyl acetate, polyethylene, metallocene, amorphous poly alpha olefins, and polyamides.

18. The structural column of claim 1 further comprising an adhesive agent attaching each sheet to the outer surface of the inner sleeve.

19. The structural column of claim 18 wherein:
the adhesive agent is selected from the group consisting of epoxy adhesives, silicone adhesives, urethane adhesives, acrylic adhesives, and mixtures thereof.

20. The structural column of claim 1 further comprising an end cap positioned at an end of the outer sleeve.

21. A method for preparing a structural column, the method comprising:
(a) providing an inner sleeve comprising a first non-glass material wherein the inner sleeve comprises at least one wall, the inner sleeve having an outer surface and an inner surface defining a hollow interior space of the inner sleeve;
(b) placing at least one sheet comprising bulk glass adjacent to at least a portion of the outer surface of the inner sleeve; and
(c) forming by over-jacketing extrusion an outer sleeve comprising a second non-glass material over at least a portion of an outer surface of each sheet such that an inner surface of the outer sleeve is attached to at least a portion of an outer surface of each sheet and the inner surface of the outer sleeve is attached to at least a portion of the outer surface of the inner sleeve.

22. The method of claim 21 wherein:
step (c) further comprises advancing a longitudinal axis of the inner sleeve perpendicularly to an axis of an extrusion screw that moves the second non-glass material.

* * * * *